(12) United States Patent
Matsumoto et al.

(10) Patent No.: US 7,164,493 B1
(45) Date of Patent: Jan. 16, 2007

(54) IMAGE PROCESSING METHOD, SYSTEM AND APPARATUS, AND STORAGE MEDIUM

(75) Inventors: Atsushi Matsumoto, Tachikawa (JP); Ken-ichi Ohta, Kawasaki (JP); Takuto Harada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/434,404

(22) Filed: Nov. 5, 1999

(30) Foreign Application Priority Data

Nov. 6, 1998 (JP) .................................. 10-316725
Nov. 6, 1998 (JP) .................................. 10-316726
Oct. 27, 1999 (JP) .................................. 11-305430

(51) Int. Cl.
*G06F 15/00* (2006.01)
*H04N 1/60* (2006.01)

(52) U.S. Cl. ...................... 358/1.9; 358/1.1; 358/518; 358/530

(58) Field of Classification Search ................ 358/1.9, 358/1.15, 1.1, 1.8, 3.09, 1.11, 1.16, 434, 504, 358/500, 501, 515, 518, 530, 535, 468
See application file for complete search history.

(56) References Cited

U.S. PATENT DOCUMENTS

| | | | | |
|---|---|---|---|---|
| 5,728,637 | A * | 3/1998 | Mishra et al. | 382/282 |
| 5,751,470 | A * | 5/1998 | Damon | 358/298 |
| 5,760,921 | A * | 6/1998 | Miyake | 358/3.07 |
| 5,822,510 | A * | 10/1998 | LeClair et al. | 358/1.16 |
| 6,021,217 | A * | 2/2000 | Nakahara | 382/169 |
| 6,100,996 | A * | 8/2000 | Amano et al. | 358/1.9 |
| 6,157,749 | A * | 12/2000 | Miyake | 382/300 |
| 6,257,693 | B1 * | 7/2001 | Miller et al. | 347/19 |
| 6,275,303 | B1 * | 8/2001 | Fukaya | 358/1.9 |
| 6,285,458 | B1 * | 9/2001 | Yada | 358/1.15 |
| 6,504,949 | B1 * | 1/2003 | Matsukubo et al. | 382/162 |
| 6,639,593 | B1 * | 10/2003 | Yhann | 345/419 |
| 6,678,426 | B1 * | 1/2004 | Bearss et al. | 382/299 |
| 2003/0007661 | A1 * | 1/2003 | Noguchi | 382/100 |

FOREIGN PATENT DOCUMENTS

| | | |
|---|---|---|
| EP | 0 665 677 A | 8/1995 |
| EP | 0 886 435 A | 12/1998 |

OTHER PUBLICATIONS

Goertzel, G., et al., "Digital Halftoning on the IBM 4250 Printer," IBM Journal of Research and Development, IBM Corporation, Armonk, USA, vol. 31, No. 1 (1987), pp. 2-15, XP002067813, ISSN: 0018-8646.

* cited by examiner

*Primary Examiner*—Thomas D. Lee
(74) *Attorney, Agent, or Firm*—Fitzpatrick, Cella, Harper & Scinto

(57) ABSTRACT

A rasterizer generates bitmap images of RGB on the basis of object data inputted from a printer driver and stores the result in an image memory. The rasterizer brings attribute information representing attributes of the input object data into correspondence with each pixel of the generated bitmap images to store in an attribute map memory. An image processing unit converts RGB bitmap images stored in the image memory into binary bitmap data for each of YMCK colors which can be processed by an image forming unit. The contents of conversion processing such as dither matrix for binarization processing are switched on the basis of the attribute information retained in the attribute map memory.

17 Claims, 23 Drawing Sheets

FIG. 5
IMAGE MEMORY
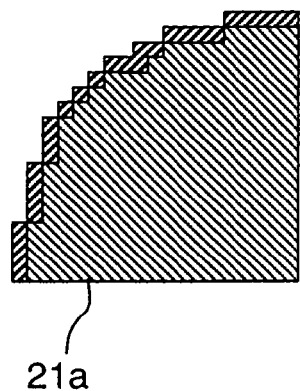
21a
ATTRIBUTE MAP MEMORY
VECTOR FLAG
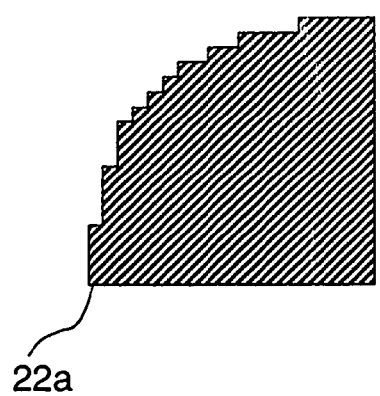
22a
CHARACTER FLAG
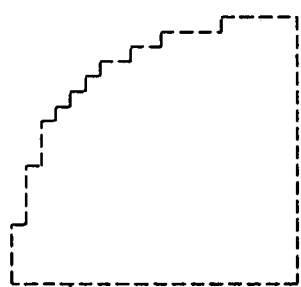
23a
EDGE FLAG
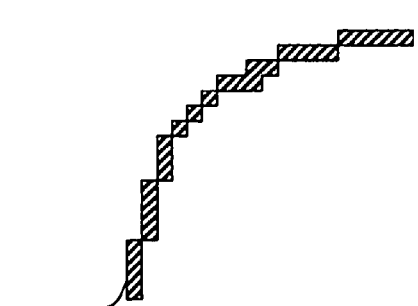
24a
EDGE BOUNDARY FLAG
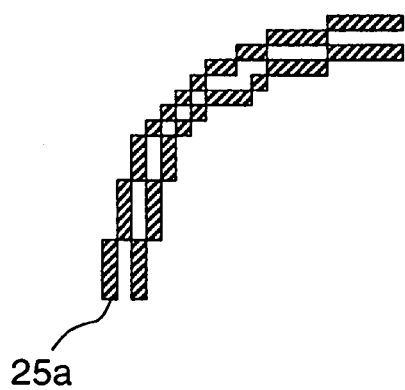
25a

FIG. 6
IMAGE MEMORY
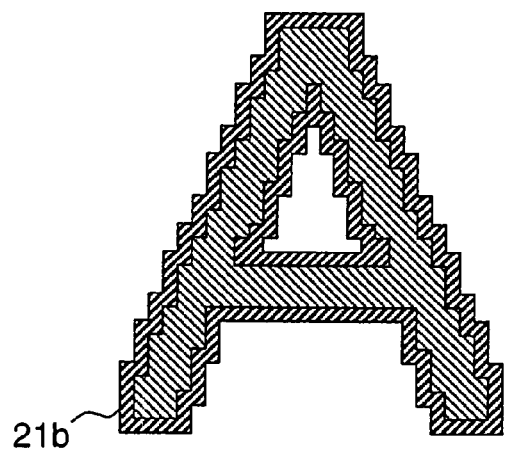
21b
ATTRIBUTE MAP MEMORY
VECTOR FLAG
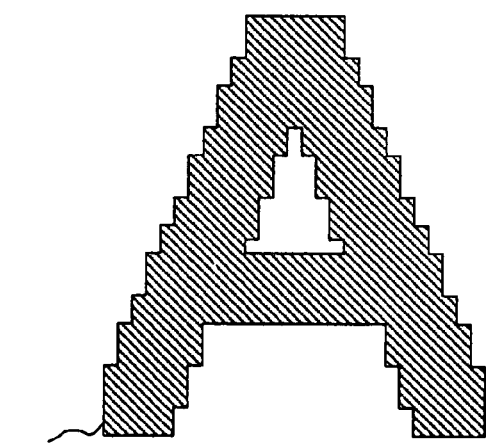
22b
CHARACTER FLAG
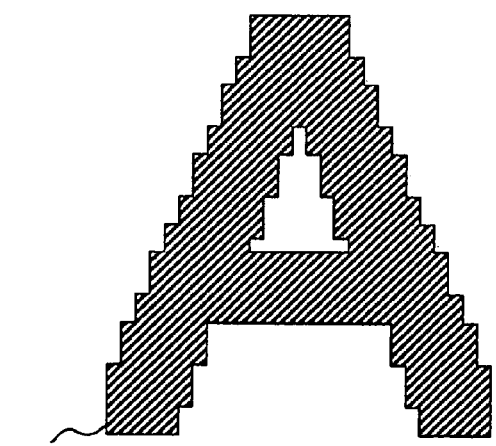
23b
EDGE FLAG
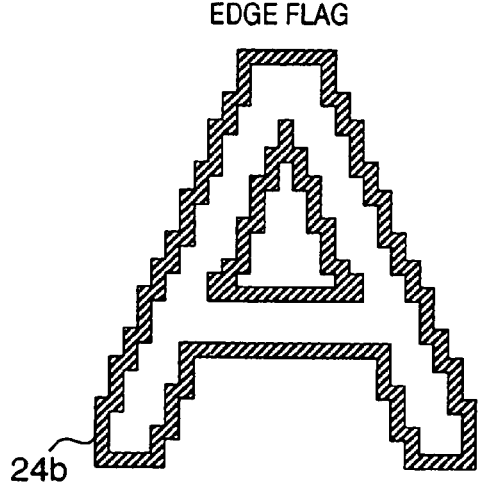
24b
EDGE BOUNDARY FLAG
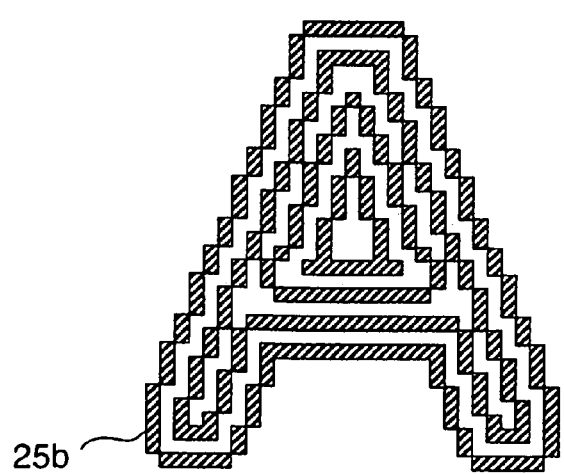
25b

FIG. 7

| 25 | 50 | 125 |
|---|---|---|
| 100 | 75 | 150 |
| 225 | 200 | 175 |

FIG. 8

| 210 | 220 | 230 | 240 | 250 |
|---|---|---|---|---|
| 200 | 70 | 80 | 90 | 100 |
| 190 | 60 | 10 | 20 | 110 |
| 180 | 50 | 40 | 30 | 120 |
| 170 | 160 | 150 | 140 | 130 |

FIG. 9

| 172 | 176 | 180 | 184 | 188 | 192 | 196 | 200 |
|---|---|---|---|---|---|---|---|
| 168 | 84 | 88 | 92 | 96 | 100 | 104 | 204 |
| 164 | 80 | 28 | 32 | 36 | 40 | 108 | 208 |
| 160 | 76 | 24 | 4 | 8 | 44 | 112 | 212 |
| 156 | 72 | 20 | 16 | 12 | 48 | 116 | 216 |
| 152 | 68 | 64 | 60 | 56 | 52 | 120 | 220 |
| 148 | 144 | 140 | 136 | 132 | 128 | 124 | 224 |
| 254 | 252 | 248 | 244 | 240 | 236 | 232 | 228 |

FIG. 10

| -1 | 0 | 0 | 0 | -1 |
|---|---|---|---|---|
| 0 | 0 | 0 | 0 | 0 |
| 0 | 0 | 5 | 0 | 0 |
| 0 | 0 | 0 | 0 | 0 |
| -1 | 0 | 0 | 0 | -1 |

FIG. 15

| BIT | | 0 | |
|---|---|---|---|
| INFORMATION | | BITMAP FLAG | |
| | | 0 | VECTOR |
| | | 1 | BITMAP |

FIG. 16

| 0 | 0 | 0 | 0 | 0 | 0 | 0 | 0 | 0 |
|---|---|---|---|---|---|---|---|---|
| 0 | 0 | 0 | 0 | 1 | 1 | 0 | 0 | 0 |
| 0 | 0 | 0 | 1 | 1 | 1 | 0 | 0 | 0 |
| 0 | 0 | 1 | 1 | 1 | 1 | 0 | 0 | 0 |
| 0 | 0 | 0 | 0 | 1 | 1 | 0 | 0 | 0 |
| 0 | 0 | 0 | 0 | 1 | 1 | 0 | 0 | 0 |
| 0 | 0 | 0 | 0 | 1 | 1 | 0 | 0 | 0 |
| 0 | 0 | 0 | 0 | 1 | 1 | 0 | 0 | 0 |
| 0 | 0 | 0 | 0 | 1 | 1 | 0 | 0 | 0 |
| 0 | 0 | 0 | 0 | 1 | 1 | 0 | 0 | 0 |
| 0 | 0 | 0 | 0 | 1 | 1 | 0 | 0 | 0 |
| 0 | 0 | 0 | 0 | 1 | 1 | 0 | 0 | 0 |
| 0 | 0 | 0 | 1 | 1 | 1 | 1 | 0 | 0 |
| 0 | 0 | 0 | 0 | 0 | 0 | 0 | 0 | 0 |
| 0 | 0 | 0 | 0 | 0 | 0 | 0 | 0 | 0 |

FIG. 21

| 25 | 50 | 125 |
|----|----|-----|
| 100 | 75 | 150 |
| 225 | 200 | 175 |

FIG. 22

| 254 | 148 | 152 | 156 | 160 | 164 | 168 | 172 |
|-----|-----|-----|-----|-----|-----|-----|-----|
| 252 | 144 | 68 | 72 | 76 | 80 | 84 | 176 |
| 248 | 140 | 64 | 20 | 24 | 28 | 88 | 180 |
| 244 | 136 | 60 | 16 | 4 | 32 | 92 | 184 |
| 240 | 132 | 56 | 12 | 8 | 36 | 96 | 188 |
| 236 | 128 | 52 | 48 | 44 | 40 | 100 | 192 |
| 232 | 124 | 120 | 116 | 112 | 108 | 104 | 196 |
| 228 | 224 | 220 | 216 | 212 | 208 | 204 | 200 |

FIG. 25

| BIT | 0 | 1 |
|---|---|---|
| INFORMATION | BITMAP FLAG | COLOR FLAG |
| 0 | VECTOR | MONOCHROME |
| 1 | BITMAP | COLOR |

FIG. 26

| BIT | 0 | 1 | 2 |
|---|---|---|---|
| INFORMATION | BITMAP FLAG | COLOR FLAG | CHARACTER FLAG |
| 0 | VECTOR | MONOCHROME | OTHER THAN CHARACTERS |
| 1 | BITMAP | COLOR | CHARACTER |

FIG. 27

| BIT | 01 | | | 2 |
|---|---|---|---|---|
| INFORMATION | OBJECT FLAG | | | CHARACTER FLAG |
| | 00 | GROUND | | 0 | MONOCHROME |
| | 01 | GRAPHIC | | 1 | CHARACTER |
| | 10 | CHARACTER | | | |
| | 11 | BITMAP | | | |

F I G. 30

| 0 (BITMAP FLAG) | 1 (COLOR FLAG) | 2 (CHARACTER FLAG) | |
|---|---|---|---|
| 0 (BITMAP) | 0 (COLOR) | 0 (OTHER THAN CHARACTERS) | } BITMAP FLAG = 0 |
| 1 (VECTOR) | 1 (MONOCHROME) | 1 (CHARACTER) | |
| | | 0 (GRADATION PRIORITY) | } BITMAP FLAG = 1 |
| | | 1 (RESOLUTION PRIORITY) | |

IMAGE PROCESSING METHOD, SYSTEM AND APPARATUS, AND STORAGE MEDIUM

BACKGROUND OF THE INVENTION

1. Field of the Invention

The present invention relates to an image processing method and apparatus, an image processing system and a storage medium.

2. Description of the Related Art

Conventionally, there is known an image processing system for generating image data in digital form for printing. Such a system as shown in FIG. 1 is generally used. FIG. 1 is a block diagram of a system for preparing a page layout document, a word processor or graphic document or the like by performing DTP (Desk Top Publishing) by using a host computer 101 to hard-copy output by using a laser beam printer, an ink jet printer or the like.

In FIG. 1, reference numeral 102 denotes an application which operates in a host computer. As representative samples of the application 102, there are such word processor software as Word (R) from Microsoft Corporation and such page layout software as PageMaker(R) from Adobe Corporation. Digital documents prepared by these software products are supplied to a printer driver 103 through an operating system (OS) of a computer (not shown).

The digital document is normally represented as a set of command data representing patterns, characters or the like, which configure one page, and these commands are to be transmitted to the printer driver 103. A series of commands configuring a screen are represented by a language system called PDL (Page Description Language). Representative example, of such PDL are GDI(R), PS(R) (Post-Script) and the like.

The printer driver 103 transfers the received PDL command to a rasterizer 105 within a raster image processor 104. The rasterizer 105 develops characters, patterns or the like expressed by the PDL command into a two-dimensional bitmap image for actually printer-outputting. Since the bitmap image becomes an image that completely fills a two-dimensional plane by repeating one-dimensional raster (line), this element 105 is called a "rasterizer". The bitmap image thus developed is temporarily stored in an image memory 106.

The foregoing operations are shown in FIG. 2. A document image 111 displayed on the host computer is transmitted to the rasterizer through the printer driver as a PDL command string 112, and the rasterizer develops the two-dimensional bitmap image on an image memory 106 as denoted by 113. The image data thus developed is transmitted to a color printer 107. The color printer 107 is provided with a known image forming unit 108 of the electrophotographic type or the ink jet recording type, which forms a visible image on a sheet for print-outputting. In this respect, the image data in an image memory 106 is transferred in synchronism with a request for transfer by a synchronizing signal, a clock signal or a specific color component signal (not shown) which is necessary to operate the image forming unit 108.

SUMMARY OF THE INVENTION

In such conventional examples as described above, it is obvious that various problems concerning the image forming unit 108 which is utilized for outputting will arise.

For example, a color printer normally forms a color image on the basis of the so-called principle of subtractive color mixture using toner or ink of four colors: cyan (C), magenta (M), yellow (Y) and black (K). On the other hand, when an application on the host computer displays an image, a color monitor is normally used, and the color monitor displays the colors using three primary colors of additive color mixture: red (R), green (G) and blue (B). The colors of an image or the like which have been laid out by reading characters, patterns, photographs or the like, which configure a document, by a scanner are all represented by colors obtained by mixing R, G and B at a certain ratio. More specifically, the rasterizer must generate a bitmap image to be transmitted to the printer, after converting the color information which has been defined using R, G and B as PDL and transferred from the host computer, into C, M, Y and K by some means or other.

The method for converting RGB into CMYK is, however, not uniquely determined, but the optimum converting method differs depending upon the attribute of the pattern defined by PDL. Referring to, for example, the example of FIG. 2, the portion denoted by 114 is a natural image read by a scanner or the like, portions denoted by 115 are graphic images electronically generated, such as a circle and a rectangle, and the portion denoted by 116 is a character (TEXT) image, and each of them has a respectively different attribute.

In a case where the color of TEXT of the character image 116 is defined as black, i.e., $R=G=B=0$, when the optimum CMYK signal thereto is represented by a 8-bit density signal, the following equations are established: $C=M=Y=0$ and $K=255$. In other words, a black character is preferably reproduced only by the black toner of the four color toners of the printer. On the other hand, in a case where the pixel value of a specific pixel of the natural image 114 is $R=G=B=0$, when it is converted to $C=M=Y=0$ and $K=255$ as in the case of the character data, it becomes lower in absolute density than the natural image originally expressed, because reproduction is performed only by black toner when a portion having the highest density of the natural image is expressed. In this case, if it is converted into values such as $C=M=Y=100$ and $K=255$ to increase the absolute density, desirable results will be obtained.

As another example, there is a case where the image forming unit can reproduce only binary dots. In this case, the rasterizer develops a multi-value bitmap image of Y, M, C and K on an image memory. On receipt of the multi-value bitmap, the image forming unit performs a known binarization process such as the error diffusion method or dithering, and print-outputs after converting a multi-value image signal into a binary image signal. At this time, the optimum binarization method varies depending upon the attributes of the image.

More specifically, for graphics such as characters and patterns, binarization, in which the size of the dither matrix is made smaller to place emphasis on resolution, is preferable. Also, for such natural images as photographs, it is preferable to make the matrix size larger, for emphasis on tonal quality.

As described above, the optimum development process using the rasterizer differs depending upon the data attribute of the object, and if rasterizing is performed using a single processing method, the image quality will be degraded.

The present invention is achieved in the light of the above-described problems, and is aimed to realize, on print-outputting image data, appropriate data processing in accordance with the attributes of each image contained in the image data for improving the quality of the output image.

According to one aspect of the present invention, an image processing apparatus comprises generation means for generating a bitmap image on the basis of object data inputted, holding means for holding plural types of attribute information representing an attribute of the object data inputted in correspondence with each pixel of a bitmap image, conversion means for converting the bitmap image generated by the generation means into data capable of being processed by an image output unit, and switching means for switching the contents of processing in the conversion means on the basis of a combination of the plural types of attributes represented by the attribute information held by the holding means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a view for explaining attribute map information according to the first embodiment.

FIG. 6 is a view for explaining attribute map information according to the first embodiment.

FIG. 7 is a view showing an example of a dither matrix according to the first embodiment.

FIG. 8 is a view showing an example of a dither matrix according to the first embodiment.

FIG. 9 is a view showing an example of a dither matrix according to the first embodiment.

FIG. 10 is a view showing an example of an edge-emphasizing filter according to the first embodiment.

FIG. 15 shows an example of a data format of attribute information according to the second embodiment.

FIG. 16 shows an example of attribute map information brought into correspondence with each pixel.

FIG. 21 shows an example of a dither matrix of size 3×3.

FIG. 22 shows an example of a dither matrix of size 8×8.

FIG. 25 shows an example of a data format for attribute information according to a third embodiment.

FIG. 26 shows an example of a data format for attribute information according to a fourth embodiment.

FIG. 27 shows another example of a data format for attribute information according to the fourth embodiment.

FIG. 30 is a conceptual diagram showing additional functions to be implemented by the fifth embodiment.

DETAILED DESCRIPTION OF THE PREFERRED EMBODIMENTS

Hereinafter, with reference to the drawings, the detailed description will be made of the preferred embodiments according to the present invention.

First Embodiment

Figure 3:
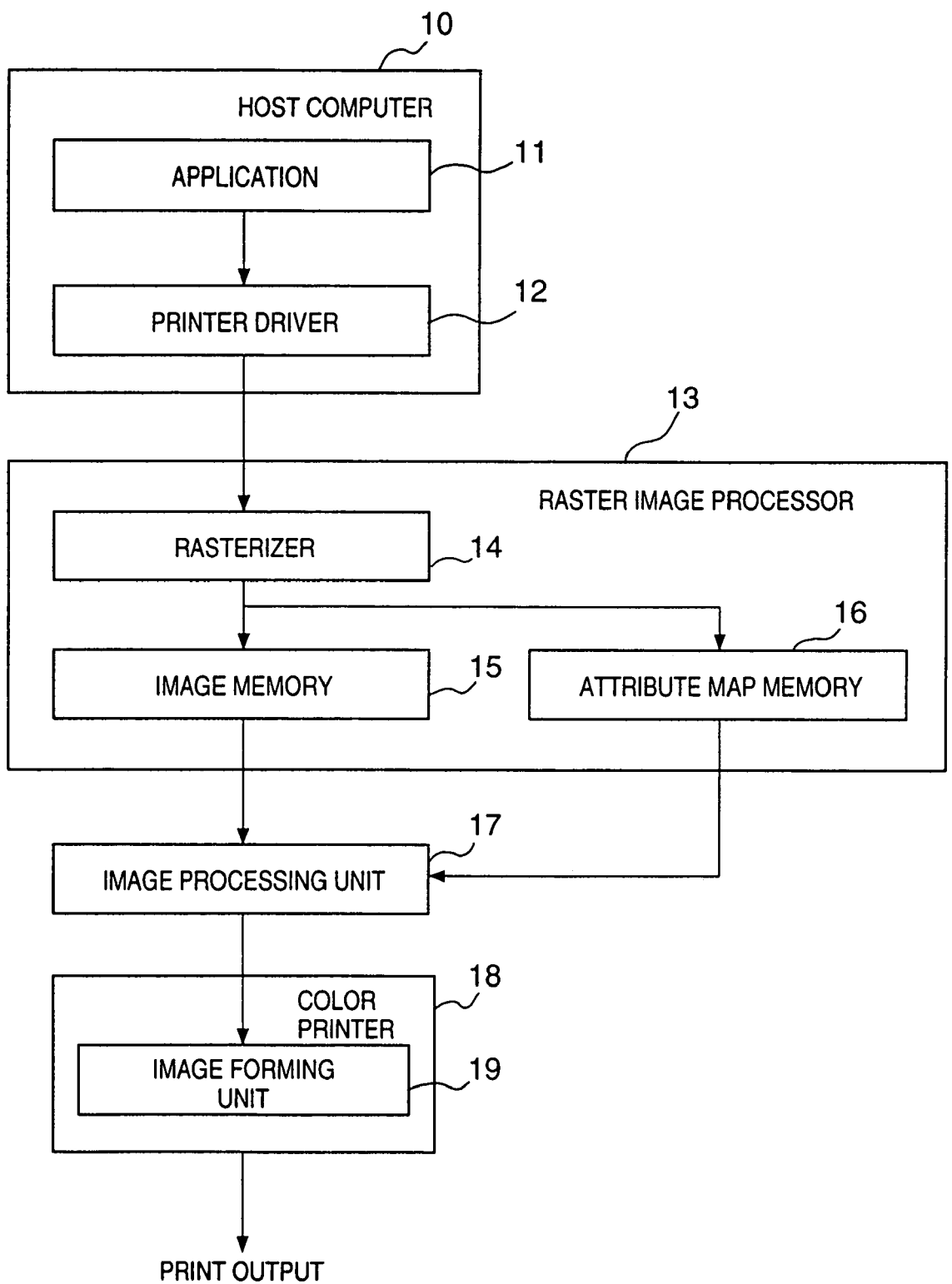
FIG. 3 is a block diagram showing the configuration of an image processing system according to a first embodiment.

FIG. 3 is a block diagram showing the configuration of an image processing system according to a first embodiment of the present invention.

Figure 1:
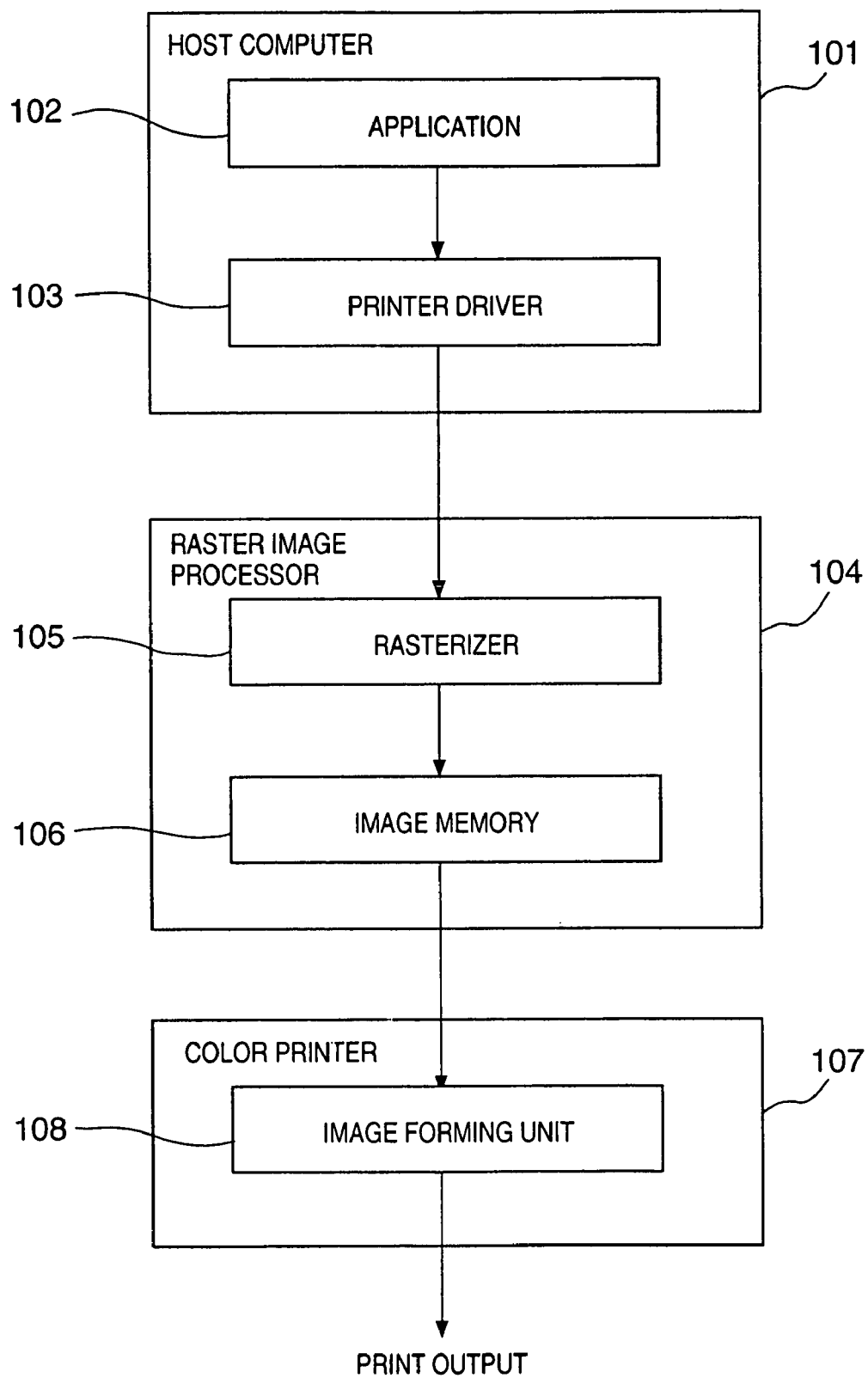
FIG. 1 is a block diagram showing the configuration of a conventional image processing system.
Figure 2:
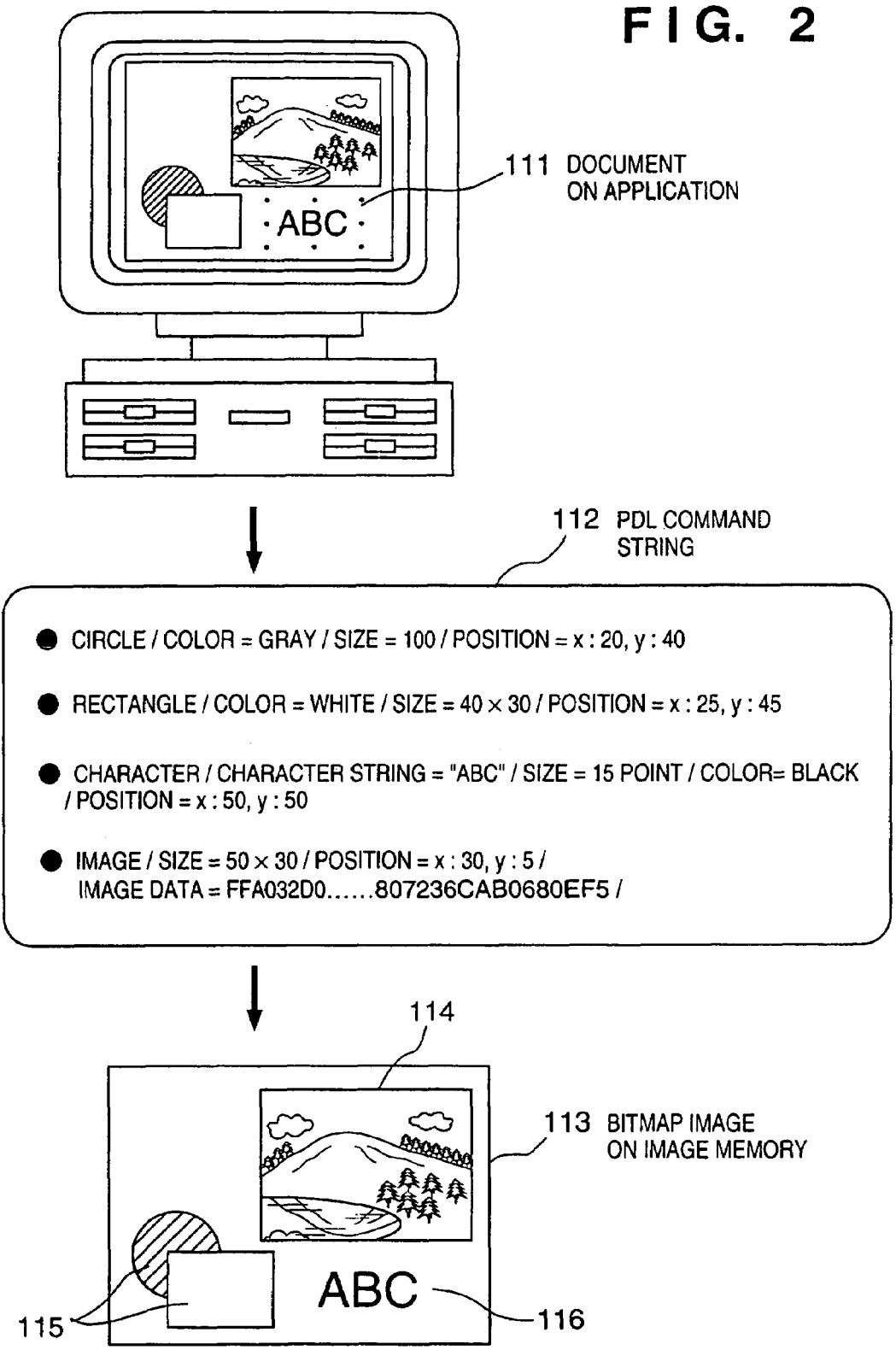
FIG. 2 is a view for explaining procedure of processes executed in the conventional image processing system.

In this respect, in FIG. 3, reference numerals 10 to 15 are the same as reference numerals 101 to 106, respectively in FIG. 1, and reference numerals 18 and 19 are the same as reference numerals 107 and 108 in FIG. 1, respectively.

The present embodiment is characterized by an attribute map memory 16 and an image processing unit 17. In this case, the image processing unit 17 is shown such that it independently exists, but it may be configured such that it is included in a raster image processor 13 or a color printer 18.

A rasterizer 14 generates a bitmap image on an image memory 15 on the basis of commands associated with individual components (hereinafter called "objects") configuring an image. At this time, attribute map information is generated on the basis of the attributes of the objects and the generated bitmap image using a method to be described later, and is written in an attribute map memory 16.

More specifically, the rasterizer 14 generates attribute map information on the basis of the attributes of commands representing the objects and bitmap image data which have been generated and written in the image memory 15 in accordance with the commands. At this time, it is also naturally possible to refer to the contents of the image memory 15 already developed as bitmap image data.

The image processing unit 17 subjects the bitmap image data in the image memory 15 to various image processing to output data to a color printer 18. At this time, referring to the attribute map information in the attribute map memory 16, the image processing method is switched appropriately.

First, detailed description will be made with respect to a method for generating the attribute map information.

Figure 4:
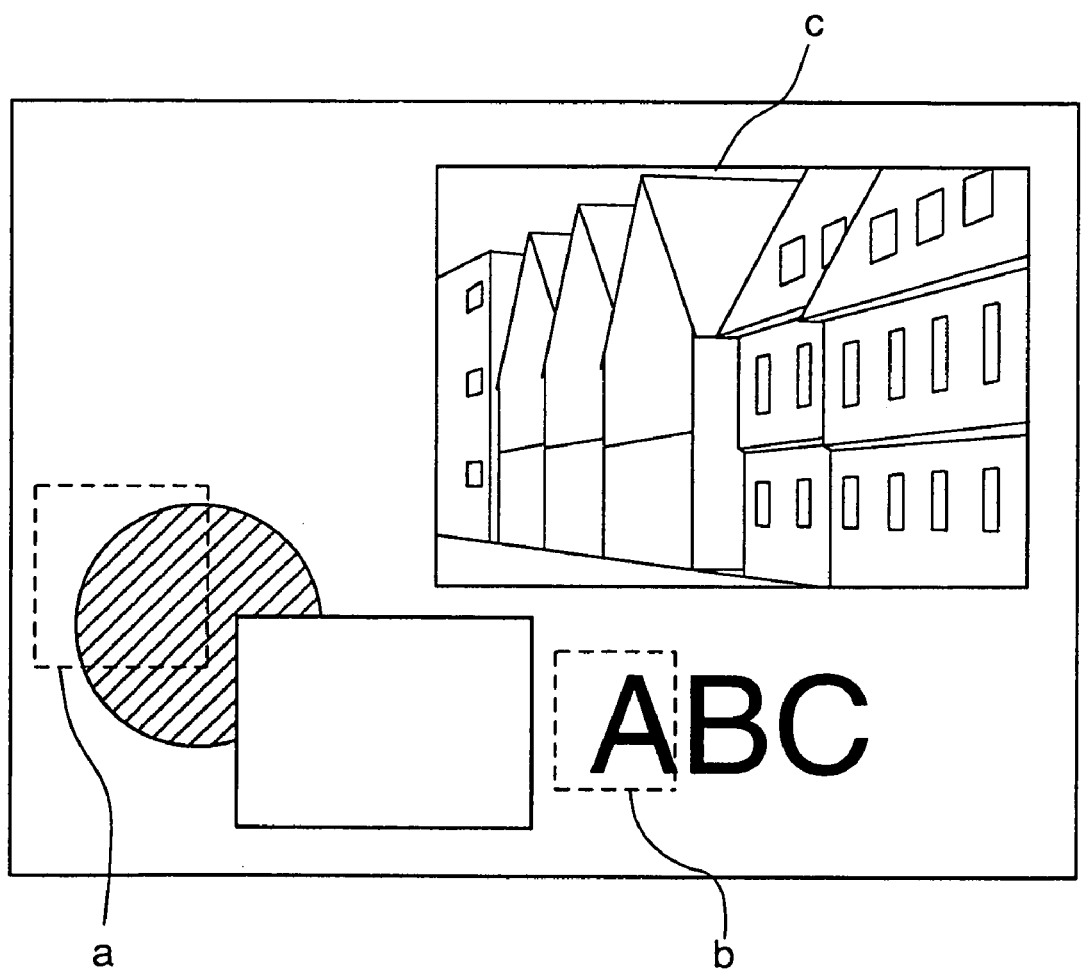
FIG. 4 is a view showing an example of a bitmap image for an object to be processed according to the first embodiment.

In a case where bitmap image data developed in the image memory 15 is as shown in FIG. 4, enlarged diagrams for areas (a) and (b) are shown in FIGS. 5 and 6 respectively.

FIG. 5 shows a bitmap image for a circle which is generated on the basis of a command for painting a circular object. The reference numeral 21a denotes bitmap image data to be written in the image memory 15, and is obtained by arranging pixel values in units of pixels as an integer value of, for example, eight bits like a two-dimensional array.

The reference numerals 22a to 25a denote attribute map information obtained by analyzing the bitmap image data to obtain each attribute thereof and attribute information flags thereof. The attribute map information is written in the attribute map memory 16. The attribute information flags (in the present embodiment, four types: vector flag, character flag, edge flag and edge boundary flag) are generated, each being 1 bit (binary of 0 or 1), in the same form of pixel array as the bitmap image data of the image memory 15. In FIG. 5, each flag is represented by a minute rectangles-having 0 as white and 1 as black.

The vector flag is set to 1 in a vector image area such as characters and graphics, and to 0 in any ground (state in which there is no object information) portion and any continuous tonal photograph portion (area (c) in FIG. 4, other than the vector image area). In this case, therefore, data 22a, which is the entire interior of a circular object, has 1 as a vector flag. The data 22a can normally be generated on the basis of a command for painting the circular object. In the present embodiment, it is possible to detect a newly filled area in the bitmap image 21a by referring the contents of the bitmap image 21a, and set vector flags for the detected area to 1 thereby data 22a is obtained.

The character flag becomes 1 in the character image area, and 0 in all other areas. In this case, therefore, since the circular object is not a character, the data 23a is all 0.

The edge flag becomes 1 at the boundary portion of the object, and 0 in all other areas. In this case, therefore, data 24a, which is the boundary of the circular object, has 1 as the edge flag. This can be generated by detecting a pixel which varies from 0 to 1 in the data 22a and setting the flag to 1 at the pixel position thus detected.

The edge boundary flag is set to 1 if the corresponding pixel is adjacent to a pixel whose edge flag has been set to 1. In this case, a pixel which is adjacent in the vicinity of 4 of the pixel whose value is 1 in the data 24a, is detected, whereby values for the pixels located both in the inside and in the outside of the pixel having value "1" in the data 24a are set to 1. Thus, the data 25a indicates an edge boundary flag. Depending upon the contents of the image processing to be described later, however, there are also cases where only the pixel at the outside of the edge has preferably 1 as the edge boundary flag. In this case, it is also possible to prevent any edge boundary flag from being generated in the intermediate density portion (area denoted by gray) in the inside of the circle by referring to the original image memory 21a together with the data 24a.

FIG. 6 shows an example for generation of attribute map information with respect to a character object. 21b to 25b have the same meaning as 21a to 25a, and the attribute map information generated from them is also almost the same. Only data 23b is different from the data 23a, and has 1 as the character flag. This is because since 21b is a character object, the character flag is set to 1 for the entire interior of the character.

In accordance with the foregoing procedure, the attribute map information is generated. The bitmap image data and attribute map information thus generated are transferred to an image processing unit 17 together with the synchronizing signal. At this time, the data at a predetermined pixel position of the image memory 15 and the attribute map information of the predetermined pixel must be brought into correspondence with each other when they are transferred. More specifically, when the pixel value of a specific pixel in the image memory 15 is transmitted to the image processing unit 17, the attribute map information (flag) of the same pixel must also be transmitted at substantially the same time. In this respect, in the continuous tonal image area shown in the area (c) in FIG. 4 and in the ground area where no image appears, all flags become 0 as will be apparent from the foregoing description.

The image processing unit 17 subjects pixel values from the image memory 15 to various image processing and the processing method is controlled by a flag from the attribute map memory 16.

In other words, with respect to the bitmap image data developed on the image memory 15, for example, switching of the size of the dither matrix, switching of a space filter for space-filter processing such as edge emphasizing, switching of such smoothing process as so-called SST or the like is performed based on the attribute map information.

With reference to FIGS. 7 to 9, description will be made of an example of processing in the case of switching the size of dither matrix based on the attribute map information.

FIGS. 7 to 9 show examples of dither matrices according to the present embodiment.

It is assumed that the bitmap image data used in the present embodiment is an integer value (0 to 255) of eight bits for each pixel. A value within each cell of the dither matrix is used as the threshold value for binarization, whereby the state (ON/OFF) of the output pixel is controlled. FIG. 7 shows a dither matrix of size 3×3, which is capable of expressing 10 levels of gray in a resolution of 200 dpi assuming an original image of 600 dpi. FIG. 8 shows a dither matrix of size 5×5, which is capable of expressing 120 dpi/26 levels of gray. FIG. 9 shows a dither matrix of size 8×8, which is capable of expressing 75 dpi/65 levels of gray.

Therefore, referring to the attribute map information corresponding to the objective pixel, in case of a continuous tonal area, that is, when the vector flag is 0, the object pixel is binarized using the dither matrix of FIG. 9. In the case of a graphic area, that is, when the vector flag is 1 and the character flag is 0, the object pixel is binarized using the dither matrix of FIG. 8. Also, in case of a character image area, that is, when the character flag is 1, the object pixel is binarized using the dither matrix of FIG. 7. Thus, characters can be reproduced at high resolution while photographs or the like are being reproduced with emphasis placed on the gradation quality, and graphics can be reproduced on intermediate density level, between them. In this manner, high-quality output images can be obtained even if bitmap images of a plurality of types of attribute map information are mixed.

Also, in the case of a pixel whose edge flag is 1, by referring to the edge flag, prior to the above described dithering, such as an edge-emphasizing filter as shown in FIG. 10 is convoluted in space, whereby the sharpness of the characters and graphics can be further improved.

Figure 11:
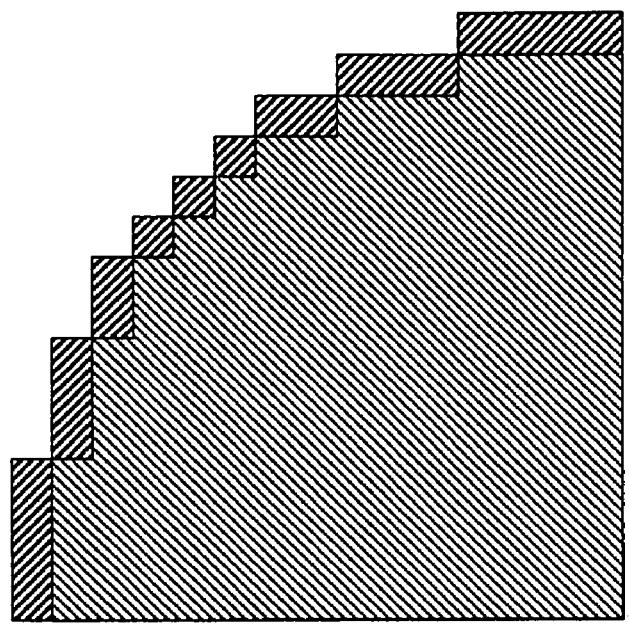
FIG. 11 is a view for explaining a smoothing process according to the first embodiment.
Figure 12:
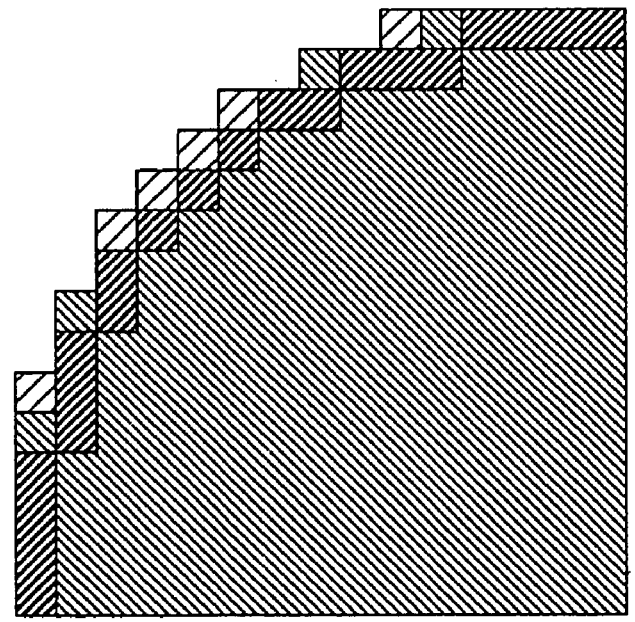
FIG. 12 is a view for explaining a smoothing process according to the first embodiment.

Also, smoothing processing, in which half-tone pixels are added to the edge portion of a character or graphic to reduce "jaggies" (jaggedness) of the edge portion, can be also performed. This processing is to add half-tone pixels to the outside of the edge portions of, for example, the image in FIG. 11 so as to make the edge portion as shown in FIG. 12 for suppressing backlash of the edge. This processing is performed only for the pixel having edge boundary flag of 1, whereby more effective results can be obtained.

In FIG. 12, only the pixels in the outside of the edge boundary are processed. This is because the interior of the pattern is not white, and therefore if the same processing is performed also on the inside edge boundary, defects would occur. Therefore, the edge boundary flag is controlled in accordance with the contents of the object in such a manner that the edge boundary flag becomes 1 only in the outside of the edge or the edge boundary flag is set to 0 when the ground is not white.

In the foregoing embodiment, as the attribute map information of an image, the description has been made of four types of attributes: whether or not it is a vector image, whether or not it is a character image, whether or not it is an edge, and whether or not it is the boundary portion of an edge. However, the present invention is not limited thereto. Various flags can be applied, for example, whether the object has a chromatic color or is achromatic, whether an edge portion is on a white ground or on another color of ground, or whether or not an edge portion is in a photograph.

Also, switching of an image processing method based on the attribute map information is not limited to the foregoing embodiment, but in addition, there are conceivable various methods such as switching of a color conversion method from RGB signal to YMCK signal, and switching of a compression method when the bitmap image data is compressed to transfer it to the printer unit.

Also, since the bitmap image data already developed is adapted to be referred when a flag is generated, for example, it is also possible to process so as not to set any character flag, in a case where a character is over-written in an area in which a gray-scale image has been already developed.

Figure 13:
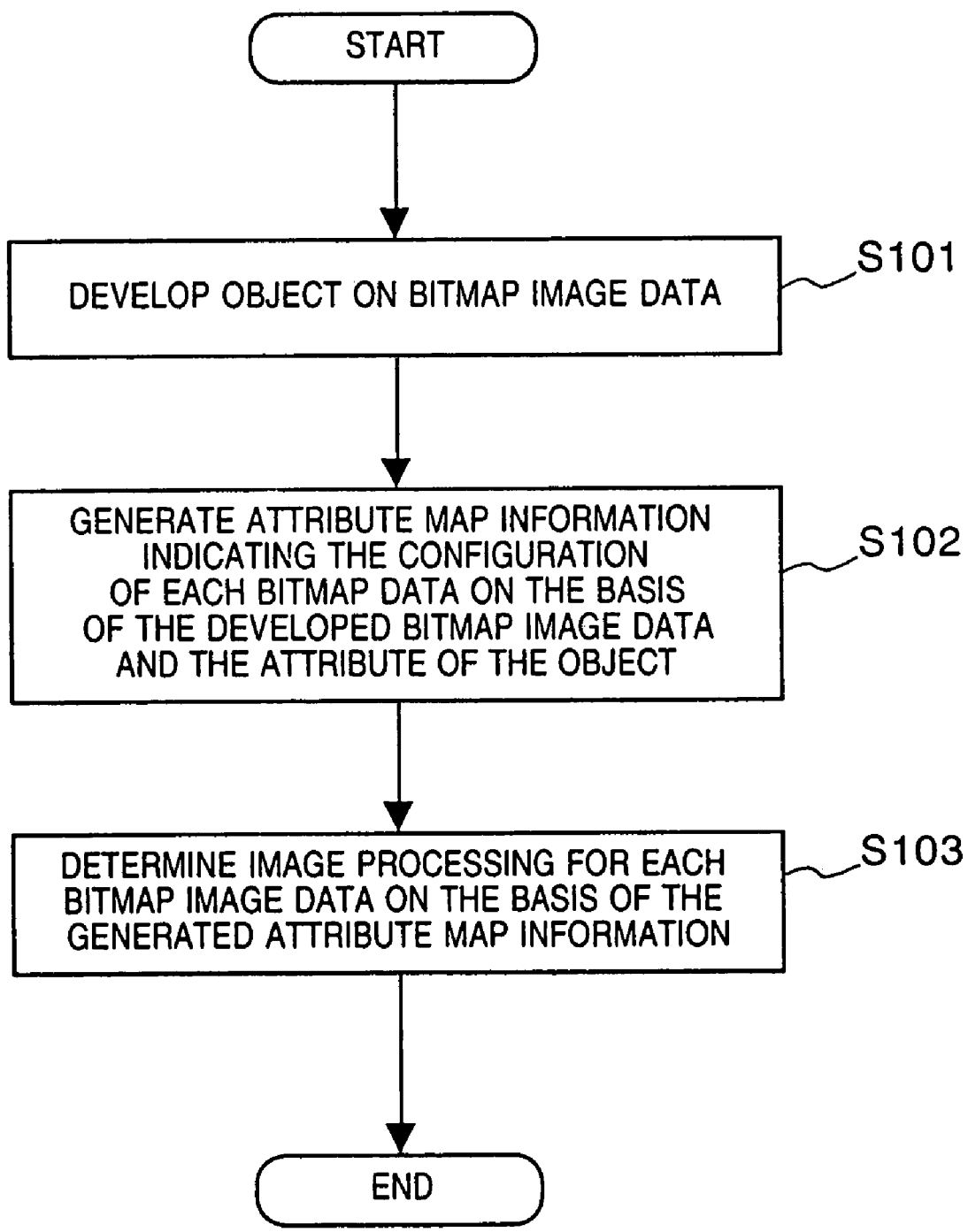
FIG. 13 is a flow chart showing a processing flow of processes to be executed in the first embodiment.

Next, with reference to FIG. 13, a description will be made with respect to a processing flow to be executed in the present (first) embodiment.

First, in step S101, each object of image data configured by a plurality of inputted objects is developed on the bitmap image data by a rasterizer 14. The bitmap image data thus developed is stored in the image memory 15. In step S1102, attribute map information of each bitmap image data is generated on the basis of the developed bitmap image data and the attribute of the object. The generated attribute map information is stored in an attribute map memory 16. In step S103, an image processing method for each bitmap image data is determined on the basis of the generated attribute map information, and executed at an image processing unit 17. Thus, an image based on the image-processed bitmap image data is formed at an image forming unit 18.

As described above, according to the first embodiment, bitmap images, in which bitmap images of a plurality of types of attribute map information are mixed, can be subjected to image processing suitable for the attribute map information, and therefore, an output image based on the bitmap image can be outputted with higher quality.

As described above, according to the first embodiment, it is possible to provide an image processing apparatus capable of outputting an image comprising images of a plurality of types of attributes mixed, with high quality, a method therefor and a computer-readable memory.

Second Embodiment

Hereinafter, with reference to the accompanying drawings, the detailed description will be made of a second preferred embodiment according to the present invention.

Figure 14:
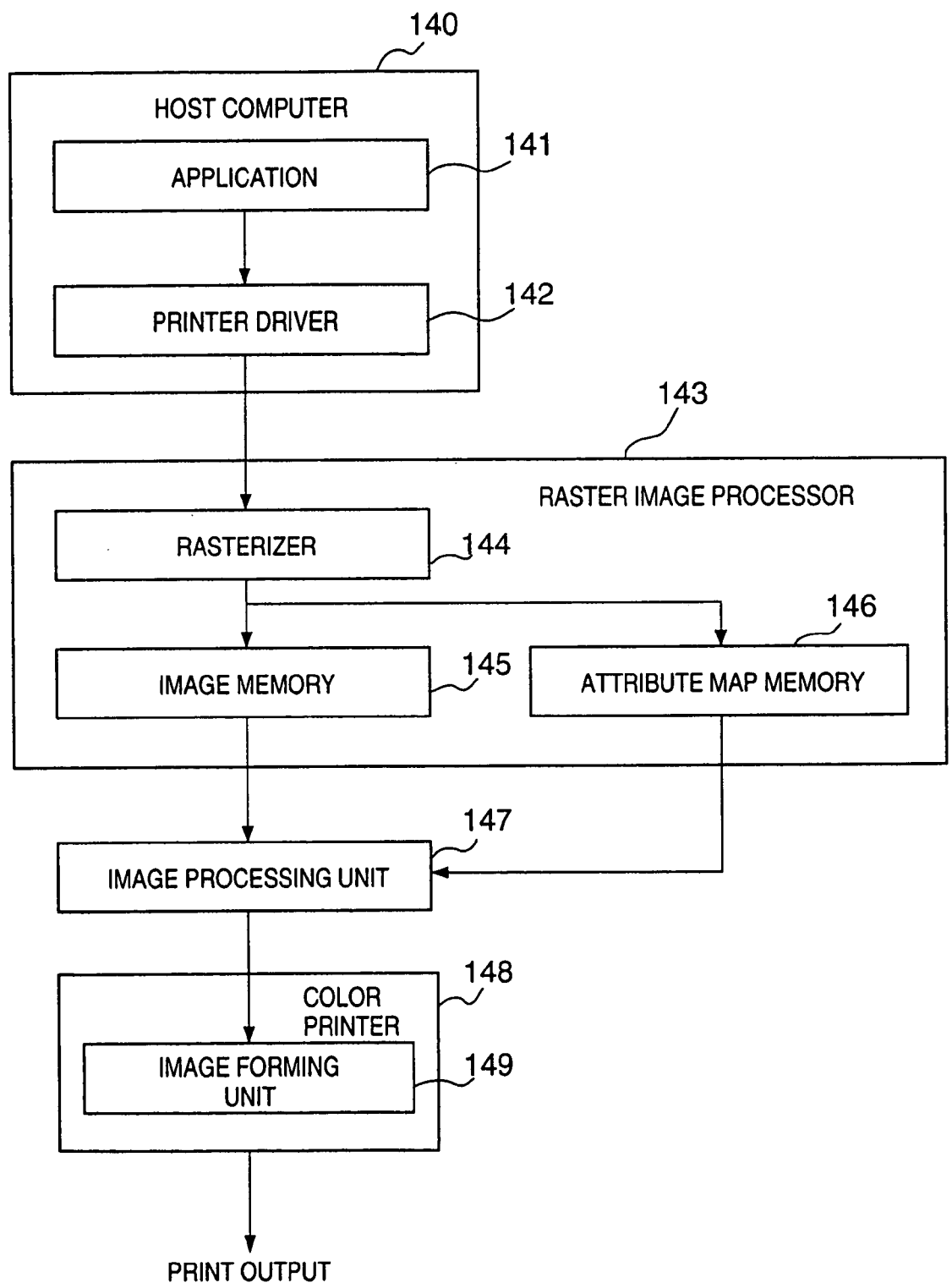
FIG. 14 is a block diagram showing the configuration of an image processing system according to a second embodiment.

FIG. 14 is a block diagram showing the configuration of an image processing system according to the second embodiment.

In FIG. 14, reference numeral 140 denotes a host computer; and 141, an application to be used within the host computer 140. Applications 141, include, for example, word processor software, a drawing system or software, graphic software and the like. Reference numeral 142 denotes a printer driver, which serves as an interface with the printer for outputting characters, graphics and bitmap images from the application 141 to the printer.

Reference numeral 143 denotes a raster image processor for developing output obtained through the printer driver into image data. Within the raster image processor 143, there are contained a rasterizer 144, an image memory 145 for storing the image data, and an attribute map memory 146. In this respect, the raster image processor may belong to the host computer or the printer.

Reference numeral 147 denotes an image processing unit, which converts the image data stored in the image memory 145 while referring to the information stored in the attribute map memory 146, into image data (for example, binary image data each of YMCK) which is outputted by an image forming unit 149 to be described later. The reference numeral 148 denotes a color printer. The color printer 148 includes an image forming unit 149 for printing image data, on a medium such as paper. The image forming unit 149 is a unit of the electrophotographic type, a unit of the ink jet type or the like. The final output result can be obtained through this image forming unit 149.

In this respect, in the present embodiment, a description will be made using a color printer 148 as a printer for performing print output, but it will be apparent that the processing of the present embodiment is easily applicable to a monochrome printer.

Also, in the present embodiment, the image memory 145 and the attribute map memory 146 are represented as a separate block respectively for the sake of understanding, but it is, of course, possible to have one recording medium to store both the image data and the attribute map data.

A digital document prepared in the application is represented by a command system called "PDL" as described in the conventional example. The command is roughly composed of three objects. The first is a character object, the second is a graphic object of vector data or the like such as patterns and free curved lines, and the third is a bitmap object such as image data obtained by reading photographs or printed matter by a scanner or the like.

The object is, if it is a character, for example, composed of data such as a character code for identifying which character it is, a font for defining the shape of a character, size information for representing a size of the character, and color information for representing the color of the character, and cannot be interpreted by the image forming unit as it is. For this reason, the printer driver 142 transmits a command string representing objects such as characters, graphics and bitmaps to the rasterizer 143 while serving as an interface with the printer, and synchronizing in such a manner that the image forming unit 149 at the final stage can output an appropriate image.

The rasterizer 143 converts the received command string into two-dimensional bitmap data which can be properly interpreted by the image forming unit, and at the same time, outputs an attribute map. The attribute map is two-dimensional information corresponding to each image pixel of attribute information. This attribute map is stored in the attribute map memory 146 in such a manner that the two-dimensional image data can be brought into correspondence with the attribute map for each pixel.

FIG. 15 shows an example of a data format for attribute information. In the present embodiment, the attribute information is 1 bit of information at the 0th bit, which here represents a bitmap flag. If the 0th bit is 1, it signifies a pixel generated from a bitmap object, and if it is 0, it signifies a pixel generated from a vector object, that is, a character or a graphic image.

The rasterizer 143 judges, on converting an object into two-dimensional bitmap data, for each pixel, from which type of an image, i.e., a character, graphics image or natural image, the object has been generated, and stores the attribute information in the attribute map memory 146 in such a manner that the attribute data can be brought into correspondence with the two-dimensional image data.

FIG. 16 shows an example of attribute map information brought into correspondence for each pixel. FIG. 16 represents an image obtained by placing a numeral "1", which is a character object, on the bitmap object. On converting into a two-dimensional bitmap, such attribute map information as shown in FIG. 16 is generated in accordance with the format described in FIG. 15. In other words, for each pixel if it is a pixel generated by a vector (character or graphic object), "0" is outputted, if it is a bitmap object, "1" is outputted. Said attribute map, as shown in FIG. 16, is stored in the attribute map memory 146.

In this respect, the attribute map may be configured in any manner so long as it is stored such that correspondence can be performed for each pixel. A method, in which attribute information is generated in an attribute map plane is shown in FIG. 16. Image data is stored in the image memory 145, and the attribute map information is stored in the attribute map memory 146. This is one example, and another mode may be adopted.

Figure 17:
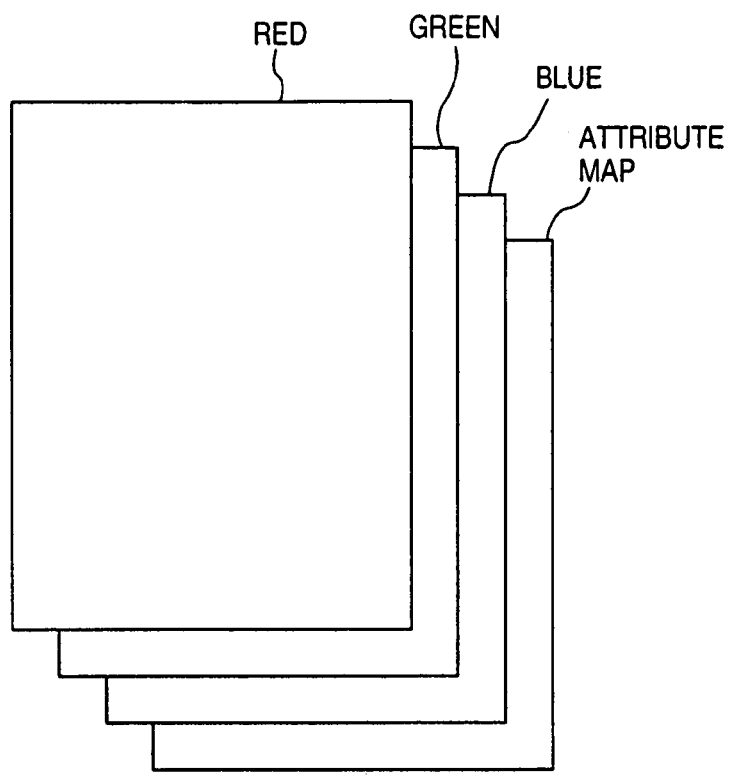
FIG. 17 shows an example of a method for storing an attribute map when image data and attribute map information are stored in the same storage medium.
Figure 18:
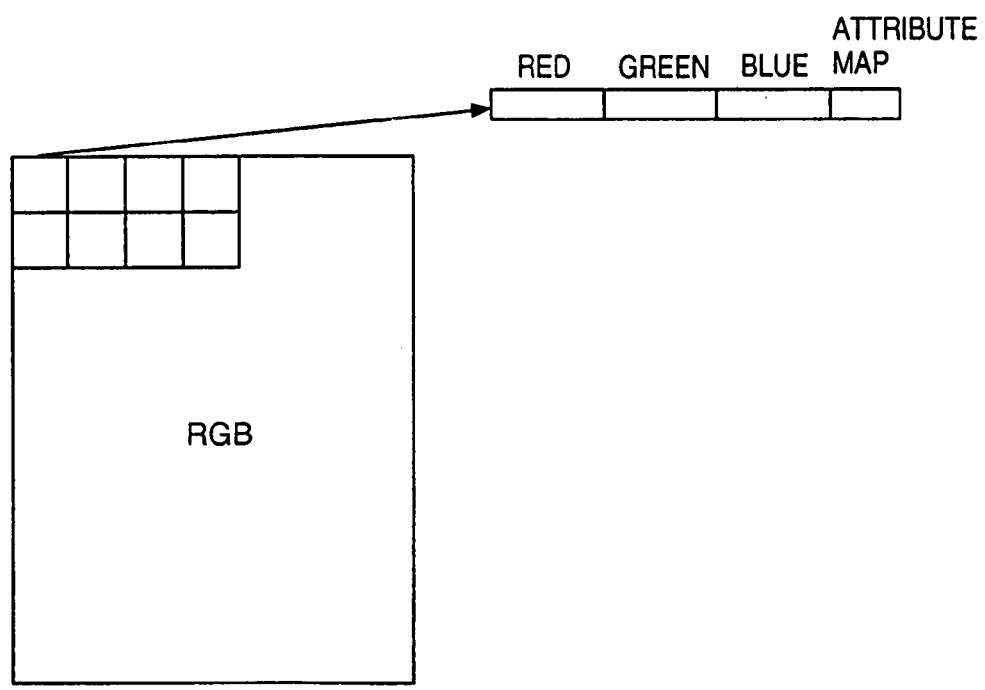
FIG. 18 shows an example of a method for storing an attribute map when image data and attribute map information are stored in the same storage medium.
Figure 19:
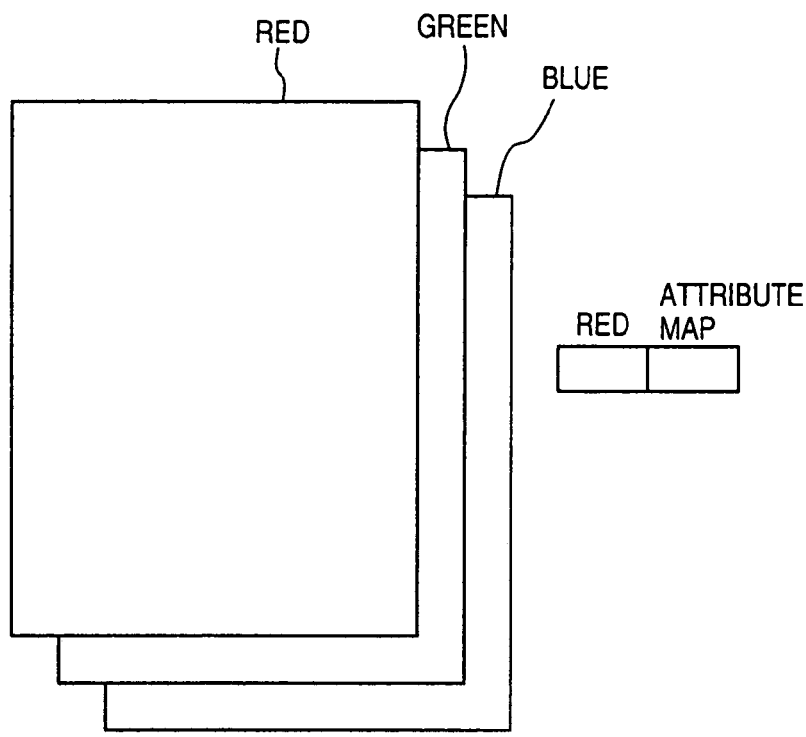
FIG. 19 shows another example of a method for storing an attribute map when image data and attribute map information are stored in the same storage medium.
Figure 20:
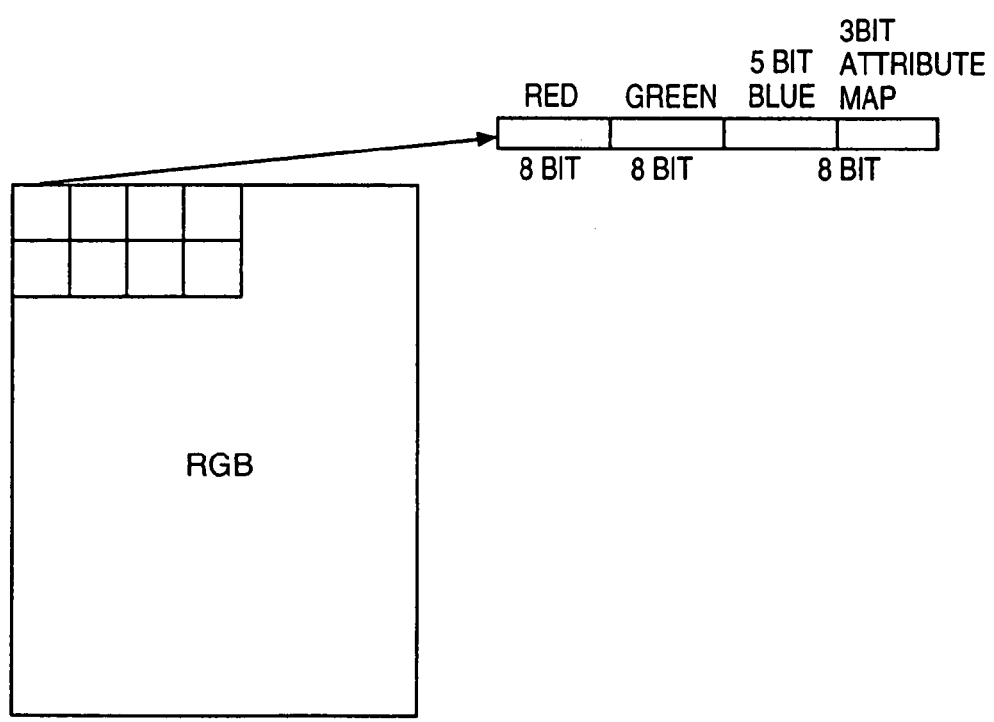
FIG. 20 shows another example of a method for storing an attribute map when image data and attribute map information are stored in the same storage medium.

If, for example, image data and attribute information are stored in the same storage medium, an attribute map plane may be added to each plane of RGB as shown in FIG. 17. Or, if RGB data is configured for each pixel as shown in FIG. 18, it may be embedded such that it is added to the RGB information for each pixel. Also, in order to configure so as not to increase the amount of data, the configuration may be arranged such that attribute information is embedded in the lower bit for each pixel on any of RGB planes or a plurality of planes thereof as shown in FIG. 19, or that when RGB data is configured within 1 pixel as shown in FIG. 20, the attribute information is embedded in the lower bit of any of RED, GREEN and BLUE (eight bits each) for each pixel, or a plurality of color information. In the example of FIG. 20, there is shown an example in which the attribute map has been embedded in the lower 3 bits of 8 bits of information of BLUE (although the attribute information is 1 bit in the second embodiment, 2 bits or 3 bits can be used as the attribute information, as described in the third and fourth embodiments later).

The image processing unit 147 fetches the attribute map information embedded as described above, determines the attributes of each pixel on the basis of the image data stored in the image memory 145 and the attribute map brought into correspondence with the image data for each pixel, and switches the image processing to perform the optimum image processing according to each attribute of the image.

Figure 23:
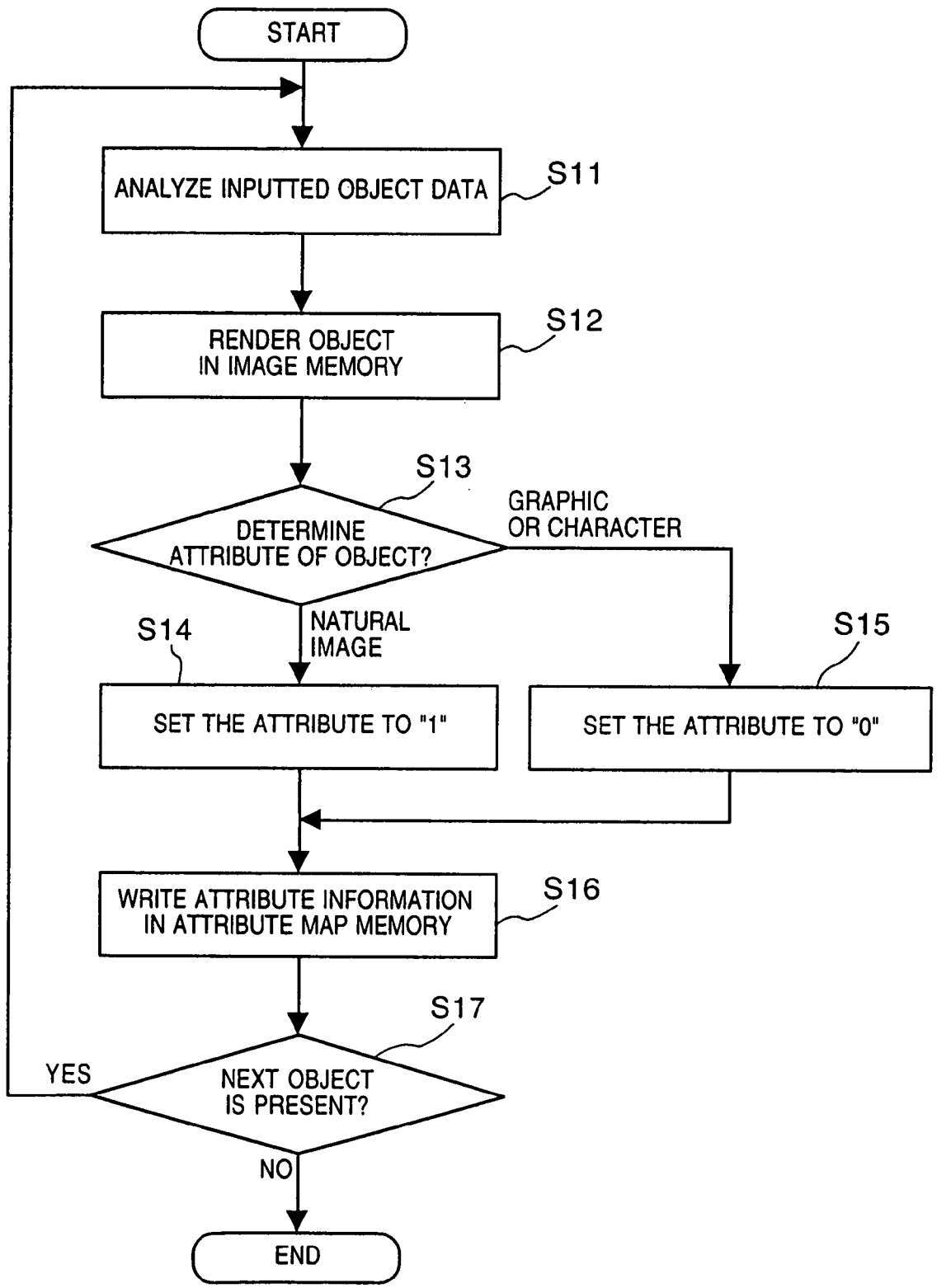
FIG. 23 is a flow chart for explaining painting of an object and generation of an attribute map according to the second embodiment.
Figure 24:
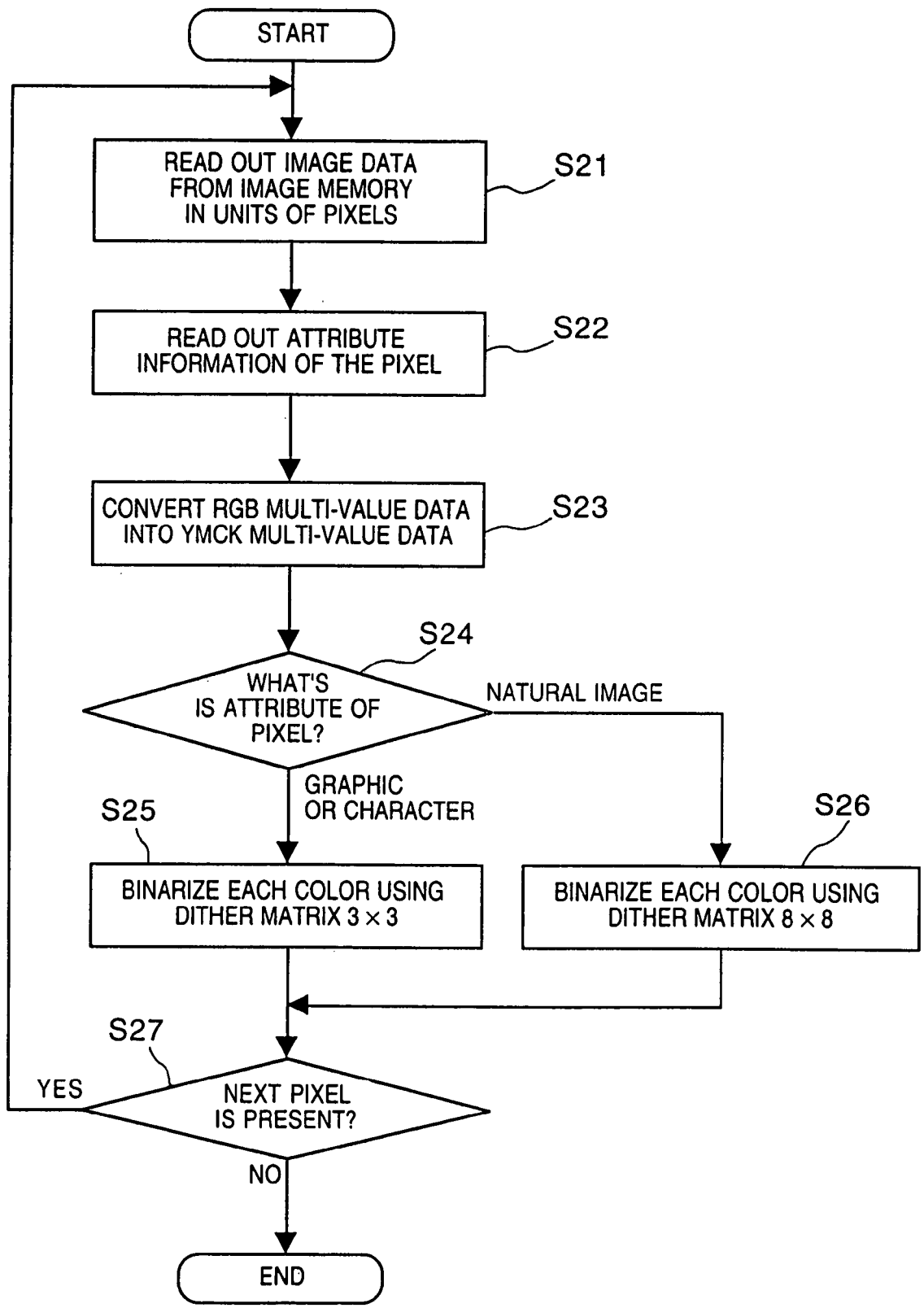
FIG. 24 is a flow chart for explaining a procedure of generation of CMYK data using an image processing unit 147.

With reference to FIGS. 23 and 24, the description will be further made on the procedure in the second embodiment described above.

FIG. 23 is a flow chart for explaining rendering of an object and generation of an attribute map according to the second embodiment. First, in step S11, the rasterizer 144 analyzes object inputted data. In step S12, an image based on RGB is developed and is rendered in the image memory 145. Next, in step S13, it is judged whether the attribute of the object is a "natural image" or a "graphic or character".

If it is determined to be a natural image in step S113, the procedure will proceed to step S14, the attribute map information is set to "1", and is written at positions on the attribute map memory 146 corresponding to each pixel of the object (step S16). On the other hand, if it is determined to be a graphic or a character in step S13, the attribute map information is set to "0", and is written at positions on the attribute map memory 146 corresponding to each pixel of the object (steps S15 and S16).

In step S17, it is judged whether or not there is a next object to be rendered, and if present, the procedure will return to step S11, and if not, the present processing will be terminated.

FIG. 24 is a flow chart for explaining a procedure for generating CMYK data by the image processing unit 147.

First, in step S21, the image data is read out from the image memory 145 in units of pixels. In the second embodiment, RGB multi-value data is stored in the image memory 145. In step S22, the attribute information of pixels read out in step S21 is read out from the attribute map memory 146. In this respect, as regards storing mode of the attribute information, various variations are shown in FIGS. 18 to 20, and in step S22, the attribute information of pixels can be read out using a read method appropriate to the respective modes.

In step S23, the RGB multi-value data is converted into YMCK multi-value data, which is converted (binarized) by the processes in steps S24 to S26 into binary data for each of YMCK colors which can be processed by the image forming unit 149. In this binarization, a dither matrix is used in the present embodiment, and at this time, the dither matrix is properly used in accordance with the attribute information of each pixel.

First, in step S24, it is judged on the basis of the attribute information read out in step S22 whether the attribute of the pixel to be processed is a "natural image" or a "graphic or character". If the attribute of the pixel to be processed is a "graphic or character", the procedure will proceed to step S25 for binarization using, for example, such a 3×3 dither matrix as shown in FIG. 21 (priority is placed on resolution). On the other hand, if the attribute of the pixel to be processed is a "natural image", the procedure will proceed to step S26 for binarization using a 8×8 dither matrix (priority is placed on gradation quality).

As described above, the following processing can be performed through the use of the attribute map information. Referring to the example of FIG. 4, the respective portions have attributes which are different from one another respectively such that portion (c) is a natural image read by a scanner or the like, portion (a) is graphic images program generated such as a circle and a rectangle, and portion (b) is a character (TEXT) image. Now, let us consider a case in which the image forming unit can reproduce only binary dots.

In this case, the rasterizer 144 develops multi-value bitmap images of Y, M, C and K on the image memory, on receipt of which the image forming unit 149 performs the known binarization process such as the error diffusion method and dithering to convert a multi-value image signal into a binary image signal for print-outputting. At this time, the optimum binarization method varies depending upon the attribute of the image. More specifically, for graphics such as characters and patterns, binarization, in which the size of the dither matrix is made smaller to place priority on resolution, is preferable. Also, for such a natural image as a photograph, it is preferable to make the matrix size larger, to put the priority on tonal reproducing ability.

In order to switch the binarization method in accordance with the image as described above, there can be also conceived a method in which the rasterizer 143 does not convert image data into CMYK, but develops the image data into a bitmap image using the values of RGB, the image forming unit detects a character image area from among the received bitmap images of RGB using the known image area separation method, and switches the converting method of converting RGB to CMYK in the detected character image area and in any other areas while generating CMYK data for outputting.

In this case, however, there is a drawback, in that the image area separation method is not reliable because it is not always capable of detecting the character area with 100% reliability, but may erroneously detect a part of the natural image area as a character area.

In contrast, according to the present embodiment, it is possible simply and reliably to apply the optimum binarization method to each image because the binarization method is switched by using the attribute map information. For example, in FIG. 4, the 0th bit representing the attribute map information corresponding to each pixel of the character image (b) and the graphic image (a) (Vector) is "0", and the 0th bit representing the attribute map information corresponding to each pixel of the natural image (c) (bitmap) is "1". For this reason, the natural image can be simply cut and separated from the character image and graphic image for each pixel.

And, for a pixel having 1 as the 0th bit in the attribute map, the dither matrix shown in FIG. 21 is used, while for a pixel having 0 as the 0th bit in the attribute map, the dither matrix shown in FIG. 22 is used. The multi-value data used in the present embodiment has 8 bits, representing 0 to 255 levels. When the value of multi-value data of each pixel is larger than the threshold value of each cell of the dither matrices of FIGS. 21 and 22, the bit is turned ON, and when it is equal to or smaller than the threshold value of each cell, the bit is turned OFF.

FIG. 21 is a view showing an example of a dither matrix having a size of 3×3. Using the dither matrix shown in FIG. 21, an original image of 600 dpi, it can be reproduced in resolution of 200 dpi, and the number of gradation levels is 10. Although the number of gradation levels is small, it is possible to reproduce the image with high resolution. FIG. 22 is a view showing an example of a dither matrix having a size of 8×8. With the dither matrix shown in FIG. 22, an original image of 600 dpi can be reproduced at resolution of 75 dpi, and the number of gradation levels is 65. Although the resolution becomes low, the number of gradation levels is great, and the natural image can be reproduced at higher quality than when the dither matrix of FIG. 21 is used.

As described above, according to the second embodiment, since the dither matrix is switched for each pixel on the basis of the attribute map information, it becomes possible to reproduce characters and graphics at high resolution while the gradation is retained in the natural image, and to provide a high-quality image.

Third Embodiment

In the second embodiment, the description has been made of a case where there is 1-bit information as the attribute map. However, the attribute information for each pixel of the attribute map is not limited to 1 bit. In a third embodiment, as an example of attribute information including a plurality of bits, the description will be made of a case where 2-bit attribute information has been adopted.

FIG. 25 is a view showing an example of a data format for attribute information according to the third embodiment. This has 2-bit information consisting of the 0th bit and 1 st bit, and the 0th bit is a bitmap flag, and is the same as described in the second embodiment. More specifically, if the bitmap flag is "1", it is shown to be a pixel generated from the bitmap object, and if "0", it is a pixel generated from the vector object, that is, it is shown to be a pixel in the character or graphic image.

The 1 st bit of the attribute map is a color flag, and if it is 1, it shows color, and if it is 0, it shows monochrome.

In this respect, in the present embodiment, the 0th bit and the 1st bit are independent, and switching of the dither matrix as shown in the second embodiment is performed using the information of the 0th bit. Thus, by referring to the information of the 1 st bit, it becomes possible further to optimize image processing.

For example, in a case where color shift is remarkable because of the characteristics of the image forming unit 149, when a character object having no color is outputted as a combination of four colors of C, M, Y and K, color appears at the edge portion of a black character because of the color shift, and the result is unsightly. In order to solve this problem, new data C', M', Y' and K, defined as C'=C-min (C, M, Y)
M'=M-min (C, M, Y)
Y'=Y-min (C, M, Y)
K=min (C, M, Y), are prepared, and a process to replace any color with K (black) as far as possible, so-called UCR (Under Color Removal), is used. In this case, color (C, M, Y) information does not spread well on a monochrome character image, and the color shift does not become conspicuous. If black spreads much on a natural image, conversely, there is the problem in that a dark color with lowered chroma appears and an unsightly image may be generated, depending upon the characteristics of the image forming unit 19. It is difficult to output both a character image and a natural image with high image quality.

In contrast, according to the third embodiment, it becomes possible to have both character images and natural images subjected to appropriate image processing. Through the use of the 2-bit attribute map shown in FIG. 25, each pixel is to have any of the following attribute information values:

| 0 bit | 1 bit | |
|-------|-------|---|
| 0 | 0 | monochrome in vector |
| 0 | 1 | color in vector |
| 1 | 0 | monochrome in bitmap |
| 1 | 1 | color in bitmap |

In case of "monochrome in vector", color shift is prevented by applying the UCR process described above, and in case of "color in bitmap", it is possible to realize a high-quality image with high chroma by stopping the UCR process so as not to spread K (black), as far as possible. In this respect, such color processing is properly performed in step S23 in the flow chart shown in FIG. 24, by switching a conversion process from RGB data to YMCK data in accordance with the attribute information read in step S22.

In this case, it is important that the attribute map be capable of coping with anything from a low-priced printer whose function is limited, to a high value-added printer having more functions, by having information provided hierarchically. For example, by increasing the number of bits of the attribute map from 1 to 2, it becomes possible to carry out either the second embodiment or the third embodiment. Thus, if two bits are used as in the third embodiment, that is, if the number of bits is increased, it becomes possible to switch image processing, making it possible to provide a higher quality image.

Therefore, it is possible to perform the processing with a low-priced printer whose function is limited, by only using the lower bit of the attribute information, and to perform highly developed processing, with a printer having more functions, by using more bits of the attribute information. In this manner, it is possible to arrange the configuration so that attribute information which is more frequently used basically located in the lower bits and attribution information is hierarchically retained, whereby a more appropriate configuration in accordance with the characteristics (such as attaching importance to cost or image quality) of the system is constructed by using the same structure of the attribute map.

Fourth Embodiment

In the third embodiment, description is made of a case where each of a plurality of bits of attribute information is independent of one another, but the plurality of bits of attribute information may be related to one another. In a fourth embodiment, description will be made of a case where a plurality of bits of attribute information are in a master-and-servant relationship to one another.

FIG. 26 shows an example of a data format for attribute information according to the fourth embodiment. This attribute information has 3-bit information, consisting of the 0th bit, 1 st bit and 2nd bit. The 0th bit is a bitmap flag, and as in the case of the second and third embodiments, "1" indicates a pixel generated from a bitmap object, while "0" indicates a pixel generated from a vector object, that is, a character or graphic image.

Also, the 1 st bit is a color flag, and as in the case of the third embodiment, "1" indicates color while "0" indicates monochrome (white having no color information, gray, black).

The 2nd bit is a character flag, and "0" indicates any object other than characters while "1" indicates a character object.

When the information up to the 2nd bit of the attribute map is used, the following becomes possible: For example, in a case where the color of TEXT (b) is defined as black of R=G=B=0 in FIG. 4, when the optimum CMYK signal for this is represented by a 8-bit density signal, the following equations are established: C=M=Y=0 and K=255. In other words, a black character is preferably reproduced using only black toner, out of the four colors of toners for the printer.

On the other hand, in a case where the pixel value of a specific pixel in the natural image (c) is R=G=B=0, if this is converted into C=M=Y=0 and K=255 as in the case of the character data, it becomes low in absolute density because reproduction of a portion originally having the highest density of the natural image is performed only by black toner. In this case, therefore, if it is converted into a value such as C=M=Y=100 and K=255 to increase the absolute density, desirable results will be obtained.

As to the graphic image (a), it is assumed that an intermediate value between the character and the natural image is optimum. That is, it is assumed that C=M=Y=50 and K=255 are the optimum values for R=G=B=0. In this case, there can be also conceived a method to subject a multi-value bitmap image to be transferred from the image memory to an image area separation process for appropriately switching color processing (color processing for R=G=B=0) as described above. However, the same drawback (the image area separation method not being entirely reliable because it is not always capable of detecting the character area with 100% reliability, but may erroneously detect a part of a natural image area as a character area) as described above cannot be prevented.

In contrast, if attribute map information according to the fourth embodiment is used, the character image (b) is configured by pixels whose 0th bit and 2nd bit are set to 0 and 1, respectively, in the attribute map, the graphic image (a) is configured by pixels whose 0th bit and 2nd bit are set to 0 in the attribute map, and the natural image (c) (bitmap) is configured by a pixel whose 0th bit is set to 1 in the attribute map. For this reason, the natural image, the character image and the graphic can be simply separated for each pixel. Therefore, as described above, it becomes possible simply and accurately to convert the pixel value of R=G=B=0 into C=M=Y=0 and K=255 in the character image unit, convert the pixel value of R=G=B=0 into C=M=Y=50 and K=255 in the graphic image unit, and convert the pixel value of R=G=B=0 into C=M=Y=100 and K=255 in the natural image unit, thus making it possible to realize better image quality. In this respect, the above-described processing for black can be realized by switching the color processing in step S23 on the basis of the attribute information read in step S22 of FIG. 24.

As described above, it is possible to provide finer attribute by a combination of a plurality of bits.

The difference between the fourth embodiment and the third embodiment is as follows:

The information of the 0th bit and the information of the 1 st bit are independent of each other, and can be used independently whereas the information of the 2nd bit is to be used in a combination with the information of the 0th bit. This time, since two bits of the 0th bit and the 2nd bit are used, it is possible to provide four types (the square of 2) of attributes. It is possible to provide eight types of attributes for combinations for three bits, and to provide 16 types of attributes for combinations for four bits.

When the 0th bit and the 2nd bit are both 1 as shown below, it indicates the ground (state in which there is no object information). When there are three (natural image, character image and graphic) object information, there can be provided four types of information for two bits, and therefore, it is possible to provide quite different attributes. Although the attribute of a character in a bitmap is inconsistent, the information of the 2nd bit cannot be used independently, but is handled such that it is used as subordinate information having different meaning depending upon the information of the 0th bit.

| 0 bit | 2 bit | |
|---|---|---|
| 0 | 0 | other than character & vector = Graphic |
| 0 | 1 | character & vector = Character |
| 1 | 0 | other than character & bitmap = Bitmap |
| 1 | 1 | character & bitmap = Ground |

In the fourth embodiment, the description is made of an attribute map by a combination of a plurality of bits. Although the 0th bit is independent information, the 2nd bit has an attribute subordinate to the 0th bit, and is used as a combination of two bits. Thus, an attribute is obtained by combining a plurality of bits.

In this respect, it is possible to make the attribute due to a combination of a plurality of bits have no independent attribute. That is, it is possible to configure it such that the bits make no sense if not combined. As shown in, for example, FIG. 27, it is possible, in the configuration of the 0th bit and the 1st bit, to configure the attribute information as shown below.

| 0-bit | 1-bit | |
|-------|-------|-----------|
| 0 | 0 | Ground |
| 0 | 1 | Graphic |
| 1 | 0 | Character |
| 1 | 1 | Bitmap |

In any case, it becomes possible to improve processing speed by omitting the process for a pixel whose attribute is the ground.

Fifth Embodiment

Figure 28:
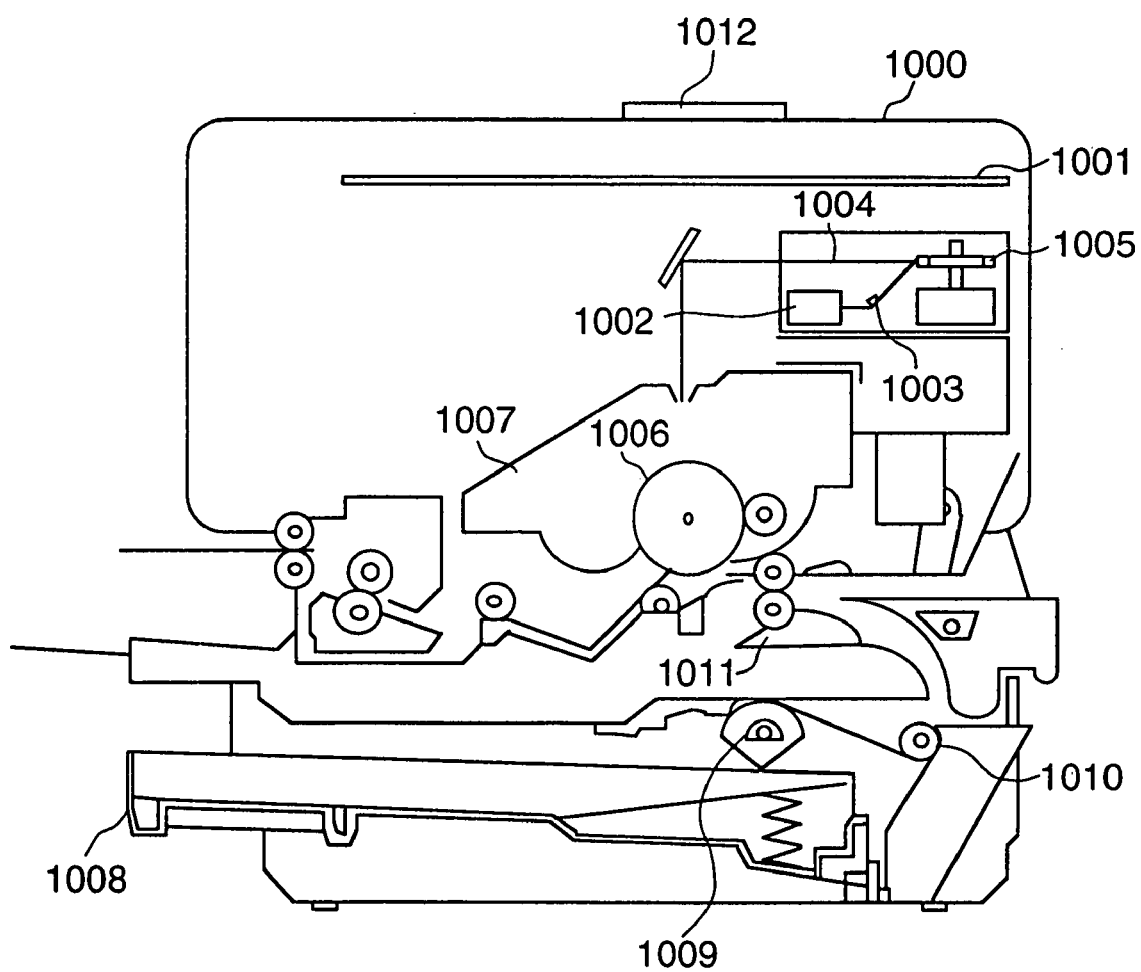
FIG. 28 is a sectional view showing the configuration of a printing device to which a fifth embodiment is applicable.

FIG. 28 is a sectional view showing the internal structure of a laser beam printer (hereinafter, abbreviated to "LBP"), which is applied to the present embodiment, and this LBP is capable of registering a character pattern, a repetitive format (form data) or the like from a data source (not shown) such as a host computer.

In FIG. 28, reference numeral 1000 denotes the LBP body, which inputs and stores character information (character code), form information or macro instructions or the like, which are supplied from a host computer connected to the outside, and prepares a character pattern, a form pattern or the like which correspond in response to those information to form an image on a recording sheet, which is a recording medium. Reference numeral 1012 denotes a control panel equipped with a switch for operation, a LED display or the like; and 1001, a printer control unit for controlling the entire LBP 1000 and analyzing character information or the like to be supplied from the host computer. This control unit 1001 mainly converts the character information into a video signal of the character pattern corresponding thereto to output to a laser driver 1002. The laser driver 1002 is a circuit for driving a semiconductor laser 1003, and switches ON-OFF laser light 1004 to be emitted from the semiconductor laser 1003 in accordance with a video signal inputted. The laser 1004 is scanned in the left and right directions by a polygonal rotating mirror 1005 to scan on an electrostatic drum 1006. This forms an electrostatic latent image for a character pattern on the electrostatic drum 1006. This latent image is formed for each of yellow, magenta, cyan and black colors, and these latent images are developed by yellow, magenta, cyan and blank developer units 1007 around the electrostatic drum 1006 respectively, and thereafter, are transferred onto a recording sheet. For this recording sheet, a cut sheet is used, and cut sheet recording sheet is contained on a sheet cassette 1008 mounted to the LBP 1000, and is taken into the apparatus by means of a feed roller 1009 and conveying rollers 1010 and 1011 to be supplied to the electrostatic drum 1006.

Figure 31:
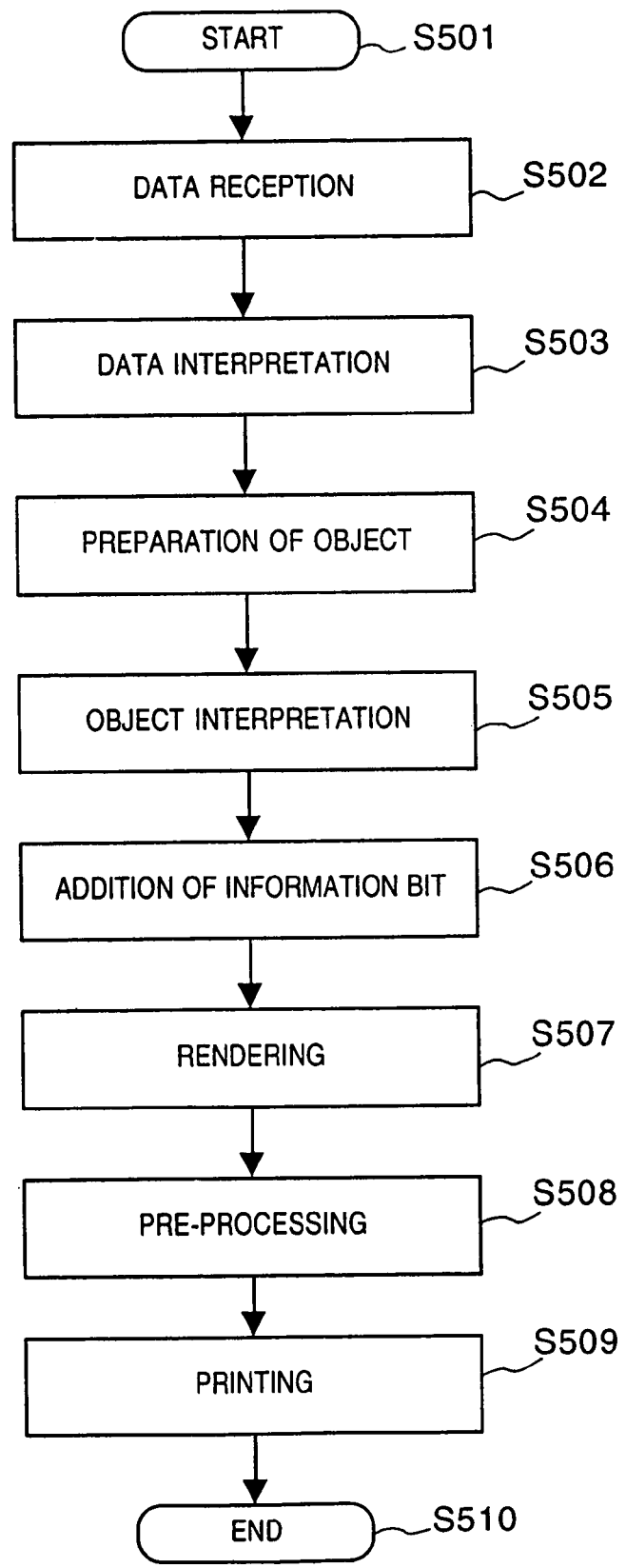
FIG. 31 is a flow chart showing the procedure of the fifth embodiment.

In a printer system thus configured, with reference to FIGS. 29 and 30, the description of the fifth embodiment will be made in accordance with the flow chart of FIG. 31.

Figure 29:
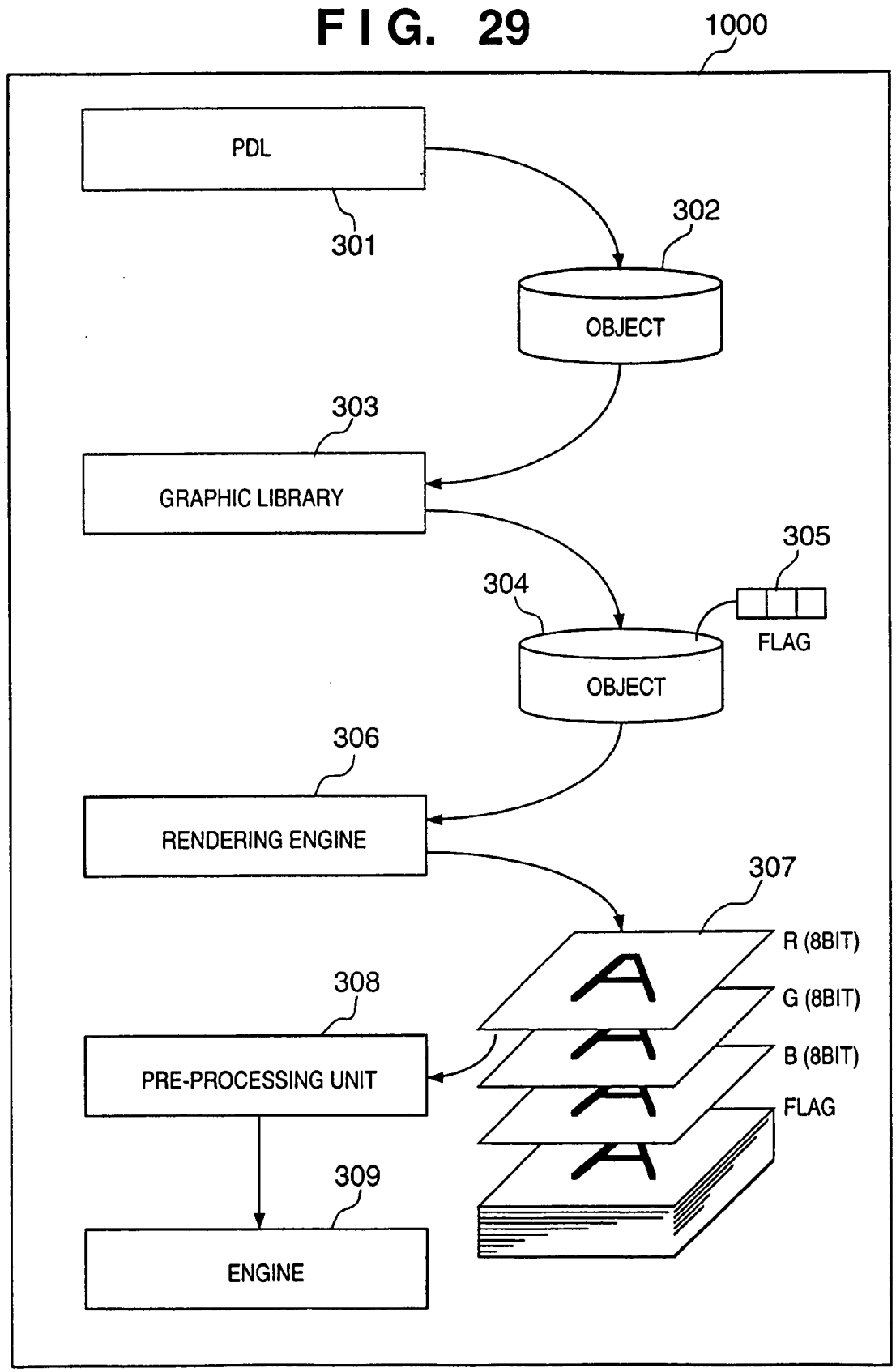
FIG. 29 is a conceptual diagram showing functions to be implemented by the fifth embodiment.

In FIG. 29, reference numeral 301 denotes a PDL interpretation unit for interpreting PDL (Page Description Language: for example, Post-Script, (R)s, GDI: (R) (or the like) data; 302, an object to be prepared by the PDL interpretation unit 301; 303, a graphic library for converting the object 302 into an instruction 304 which a rendering engine can interpret and adding object information (flag) 305 (for the object information, see FIG. 31 to be described later); 306, a rendering engine; 307, a bitmap image of (8 bits for each of RGB colors +object information bit flag) 3 bits)/pixel; and 308, a pre-processing module for performing image processing for printing the bitmap image 307 with a printer engine 309.

FIG. 30 shows an object information 305 in detail. The object information uses 3 bits, 0th bit is a bit (will be called "Bitmap flag") showing that the object is a bitmap object or a vector graphic, and 1st bit is a bit (will be called "color flag") showing that the object is a color object or a monochrome object. 2nd bit is a bit showing that the object is a character or not when the bitmap flag is 0 (=Bitmap data), and a bit (will be called "character flag") showing gradation priority or resolution priority when the bitmap flag is 1 (=vector data).

Hereinafter, with reference to FIG. 32, the description will be made with respect to the procedure in processing blocks shown in FIG. 29.

When the LBP 1000 receives print data (step S502), the PDL interpretation unit 301 interprets the data (step S503). The PDL interpretation unit 301 outputs the object 302 with the interpretation result as one rendering instruction of one object in most cases (step S504). The graphic library 303 interprets the object 302 (step S505), and prepares the instruction 304 by adding the object information flag 305 on the basis of the interpretation result (step S506). The rendering 306 renders the instruction 304 and the object information flag 305 to prepare the bitmap image 307 (step S507). At this time, the rendering object is only the instruction 304, and the object information flag 305 is passed through as it is to be added to each pixel of the rendering result. The pre-processing unit 308 subjects the bitmap image 307 to pre-processing for printing by the engine 309 (step S508). Concretely, RGB24 Bit-3 CMYK1Bit conversion (1-color conversion, binarization) and black character treatment (in the case of a color character whose pixel value gets closer and closer to black, and so more and more, the process of painting the character uses black toner) or the like are performed. The engine 309 prints the result (step S509) to complete the processing.

In the above-described configuration, the rendering result of the rendering engine has been set to 8 bit each of RGB/pixel, but it goes without saying that the similar result can be obtained for the rendering engine which renders in the other color space.

As described above, according to the present embodiment, even after the completion of the rendering, it is possible for the pixel to retain the information of the original object, and more accurate post-processing such as edge extraction can be performed.

In this respect, the present embodiments may be applied to a system configured by a plurality of equipment (such as, for example, a host computer, an interface equipment, a reader and a printer) and to an apparatus configured by one equipment.

Also, it goes without saying that the objects of the above-described embodiments can be achieved even if storage media, in which program codes for software for realizing the functions of the embodiments have been recorded, are supplied to the system or the apparatus, and the computer (or CPU or MPU) of the system or the apparatus reads out and executes the program codes stored in the recording media.

In this case, the program codes themselves read out from the storage media are to realize the functions of the embodiments described above, and the storage media in which the program codes have been stored are to configure the present invention.

For the storage medium for supplying the program code, there can be used, for example, a floppy disk, a hard disk, an optical disk, a magneto-optic disk, CD-ROM, CD-R, magnetic tape, a non-volatile memory card, ROM or the like.

Also, it goes without saying that there is included a case where a program code read out by the computer is executed, whereby the function of the above-described embodiment is not only realized, but also OS (operating system), which is operating on the computer, or the like perform a part or the whole of the actual processing on the basis of the instruction of the program code to realize the function of the embodiment described above by the processing.

Further, it goes without saying that there is also included a case where the program code read out from the storage medium is written in a function expanded board inserted into the computer or in a memory provided for a function expansion unit connected to the computer, and thereafter, the CPU or the like provided for the function expanded board or the function expansion unit perform a part or the whole of the actual processing on the basis of the instruction of the program code to realize the function of the embodiment described above by the processing.

As described above, on print-outputting image data, appropriate data processing based on the attributes of each image included in the image data is realized, and the quality of the output image is improved.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus, comprising:
generation means for generating a bitmap image on the basis of inputted object data;
hold means for holding attribute information representing attributes of the inputted object data in units of pixels of a bitmap image generated by said generation means, the attribute information being formed by allocating plural bits to each pixel of the bitmap image and each of the plural bits indicating a different type of attribute respectively;
conversion means for converting the bitmap image generated by said generation means into data capable of being processed by an image output unit; and
switch means for switching the contents of processing for each pixel of the bitmap image in said conversion means on the basis of the plural bits of the attribute information held by said hold means corresponding to that pixel,
wherein the number of bits used, from the plural bits of the attribute information, by said switch means is different in accordance with characteristics of image processing to be performed, and
wherein attribute information which is more frequently used is located in the lower bits and attribute information is hierarchically retained.

2. The image processing apparatus according to claim 1, wherein said holding means holds an attribute map in which the attribute information is arranged for each pixel corresponding to a two-dimensional coordinate position of the bitmap image.

3. The image processing apparatus according to claim 1, wherein said holding means embeds the attribute information into bits of a part of each pixel data of the bitmap image.

4. The image processing apparatus according to claim 1, wherein the attribute information includes information representing whether object data corresponding thereto has the form of bitmap data or the form of vector data.

5. The image processing apparatus according to claim 1, wherein said conversion means includes processing for converting a bitmap image generated by said generation means into binary data using a dither matrix, and said switch means changes the dither matrix used in said conversion means on the basis of the attribute information.

6. The image processing apparatus according to claim 1, wherein said generation means generates a bitmap image based on RGB color space, said conversion means includes color conversion processing for converting each pixel data of the bitmap image into pixel data represented by YMCK color space, and said switch means changes an algorithm of said color conversion processing on the basis of the attribute information held by said hold means.

7. The image processing apparatus according to claim 1, wherein the attribute information is configured by a plurality of bits, and said switch means switches the contents of processing of said conversion means in accordance with a combination of ON/OFF states of those bits.

8. The image processing apparatus according to claim 1, wherein the object data is represented by a page description language.

9. The apparatus according to claim 1, wherein the characteristics of image processing to be performed indicate when importance is attached to either cost or image quality.

10. A computer readable medium storing a control program for image processing, said control program comprising:
codes for a generation process for generating a bitmap image on the basis of object data inputted;
codes of a holding process for holding attribute information representing attributes of the object data in units of pixels of a bitmap image generated in said generation process for holding in a memory, the attribute information being formed by allocating plural bits to each pixel of the bitmap image and each of the plural bits indicating a different type of attribute respectively;
codes of a conversion process for converting the bitmap image generated in said generation process into data capable of being processed by an image output unit; and
codes of a switching process for switching the contents of processing for each pixel of the bitmap image in said conversion process on the basis of the plural bits of the attribute information corresponding to that pixel,
wherein the number of bits used, from the plural bits of the attribute information, in execution of said codes of the switching process is different in accordance with characteristics of image processing to be performed, and
wherein attribute information which is more frequently used is located in the lower bits and attribute information is hierarchically retained.

11. An image processing system having a host device and an image output unit, comprising:

generation means for generating a bitmap image on the basis of object inputted data;

hold means for holding attribute information representing attributes of said inputted object data in units of pixels of the bitmap image generated by said generation means, the attribute information being formed by allocating plural bits to each pixel of the bitmap image and each of the plural bits indicating a different type of attribute respectively;

conversion means for converting the bitmap image generated by said generation means into data capable of being processed by the image output unit; and switch means for switching the contents of processing for each pixel of the bitmap image in said conversion means on the basis of the plural bits of the attribute information corresponding to that pixel, wherein the number of bits used, from the plural bits of the attribute information, by said switch means is different in accordance with characteristics of image processing to be performed, and wherein attribute information which is more frequently used is located in the lower bits and attribute information is hierarchically retained.

12. The image processing system according to claim 11, wherein there are one or more units of attribute information of low order concept which are subordinate to that of high order concept.

13. The image processing system according to claim 11, wherein the attribute information contains information representing whether object data corresponding thereto represents a monochrome or a color object.

14. The image processing system according to claim 11, wherein the attribute information contains information representing whether object data corresponding thereto represents a character or any kind of object other than characters.

15. The image processing system according to claim 11, wherein the attribute information contains information representing whether it has a single bit or a plurality of bit strings and whether or not it is a ground, and wherein said conversion means omits processing for a pixel which is a ground.

16. An image processing method, comprising the steps of:
generating a bitmap image on the basis of object data inputted;
holding in a memory attribute information representing attributes of the inputted object data in units of pixels of the bitmap image generated in said generating step, the attribute information being formed by allocating plural bits to each pixel of the bitmap image and each of the plural bits indicating a different type of attribute respectively;

converting the bitmap image generated in said generating step into data capable of being processed by an image output unit; and switching the contents of processing for each pixel of the bitmap image in said converting step on the basis of a combination of the plural bits of the attribute information held in said holding step corresponding to that pixel, wherein the number of bits used, from the plural bits of the attribute information, in said switching step is different in accordance with characteristics of image processing to be performed, and wherein attribute information which is more frequently used is located in the lower bits and attribute information is hierarchically retained.

17. An image processing apparatus, comprising:

a bitmap image generator, arranged to receive inputted object data and to produce a corresponding bitmap image;

a data holding unit arranged to receive and to hold attribute information representing a attributes of the inputted object data in units of pixels of the bitmap image generated by said bitmap image generator, the attribute information being formed by allocating plural bits to each pixel of the bitmap image and each of the plural bits indicating a different type of attribute respectively;

a converter adapted to convert the bitmap image generated by said bitmap image generator into data capable of being processed by an image output unit; and a switch unit, adapted and arranged to switch the contents of processing for each pixel of the bitmap image in said converter on the basis of a combination of the plural bits of the attribute information corresponding to that pixel, wherein the number of bits used, from the plural bits of the attribute information, by said switch unit is different in accordance with characteristics of image processing to be performed, and wherein attribute information which is more frequently used is located in the lower bits and attribute information is hierarchically retained.

* * * * *

UNITED STATES PATENT AND TRADEMARK OFFICE
CERTIFICATE OF CORRECTION

PATENT NO. : 7,164,493 B1
APPLICATION NO. : 09/434404
DATED : January 16, 2007
INVENTOR(S) : Atsushi Matsumoto et al.

It is certified that error appears in the above-identified patent and that said Letters Patent is hereby corrected as shown below:

<u>Title Page, Item (56)</u> U.S. Patent Documents

"5,728,637" should read --5,729,637--.

<u>COLUMN 5</u>

Line 20, "rectangles-having" should read --rectangles having--; and
Line 33, "to 1" should read --to 1, and--.

<u>COLUMN 12</u>

Line 8, "1 st" should read --1st--.

<u>COLUMN 13</u>

Line 41, "1 st" should read --1st--.

<u>COLUMN 14</u>

Line 37, "1 st" should read --1st--.

<u>COLUMN 15</u>

Line 9, "1 st" should read --1st--; and
Line 56, "blank" should read --black--.

UNITED STATES PATENT AND TRADEMARK OFFICE
CERTIFICATE OF CORRECTION

PATENT NO.       : 7,164,493 B1
APPLICATION NO.  : 09/434404
DATED            : January 16, 2007
INVENTOR(S)      : Atsushi Matsumoto et al.

It is certified that error appears in the above-identified patent and that said Letters Patent is hereby corrected as shown below:

<u>COLUMN 20</u>

Line 24, "a" should be deleted.

Signed and Sealed this

Twenty-seventh Day of November, 2007

JON W. DUDAS
*Director of the United States Patent and Trademark Office*